United States Patent
Zhang et al.

(10) Patent No.: US 10,742,389 B2
(45) Date of Patent: Aug. 11, 2020

(54) METHOD, DEVICE AND SYSTEM FOR SYNCHRONIZATION MESSAGE TRANSMISSION

(71) Applicant: ZTE Corporation, Shenzhen (CN)

(72) Inventors: Yuanbin Zhang, Shenzhen (CN); Bin Luo, Shenzhen (CN); Yuan Gu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/099,069

(22) PCT Filed: Aug. 31, 2017

(86) PCT No.: PCT/CN2017/100006
§ 371 (c)(1),
(2) Date: Nov. 5, 2018

(87) PCT Pub. No.: WO2018/041228
PCT Pub. Date: Mar. 8, 2018

(65) Prior Publication Data
US 2019/0199505 A1    Jun. 27, 2019

(30) Foreign Application Priority Data
Aug. 31, 2016 (CN) .......................... 2016 1 0799043

(51) Int. Cl.
*H04L 7/00* (2006.01)
*H04J 3/16* (2006.01)
*H04J 3/06* (2006.01)

(52) U.S. Cl.
CPC ............ *H04L 7/0008* (2013.01); *H04J 3/065* (2013.01); *H04J 3/0661* (2013.01); *H04J 3/1652* (2013.01);
(Continued)

(58) Field of Classification Search
CPC .. H04J 2203/0085; H04J 3/065; H04J 3/0661; H04J 3/0667; H04J 3/1652;
(Continued)

(56) References Cited

U.S. PATENT DOCUMENTS 8,982,912 B2 * 3/2015 Fourcand ............. H04J 3/0602
370/504
9,124,533 B2 * 9/2015 Chen ................... H04L 41/5022
(Continued)

FOREIGN PATENT DOCUMENTS

CN      102045124 A      5/2011
CN      102196321 A      9/2011
(Continued)

OTHER PUBLICATIONS

Xueqiao et al; Implementation and research of hardware time stamping techniques based on IEEE 1588; IEEE, 2011; pp. 6-9. (Year: 2011).*

(Continued)

*Primary Examiner* — Amritbir K Sandhu
(74) *Attorney, Agent, or Firm* — Cantor Colburn LLP

(57) ABSTRACT

A method, device and system for synchronization message transmission are provided. The method may include that: a transmitting end selects at least one Ethernet Physical Layer Link (PHY) for synchronization message transmission from a Flexible Ethernet (FlexE) group (S201); after encapsulating the synchronization message according to a preset encapsulation strategy, the transmitting end inserts the synchronization message into a synchronization message channel in overhead of the selected Ethernet PHY (S202); and the transmitting end transmits the synchronization message through the selected Ethernet PHY (S203).

20 Claims, 14 Drawing Sheets

(52) U.S. Cl.
CPC .......... *H04J 3/1658* (2013.01); *H04L 7/0054* (2013.01); *H04L 7/0075* (2013.01); *H04J 3/0667* (2013.01); *H04J 2203/0085* (2013.01)

(58) Field of Classification Search
CPC .... H04J 3/1658; H04L 7/0008; H04L 7/0054; H04L 7/0075
USPC ................................................ 398/140–172
See application file for complete search history.

(56) References Cited

U.S. PATENT DOCUMENTS

| | | | | |
|---|---|---|---|---|
| 9,900,120 | B2* | 2/2018 | Wang | H04J 3/0697 |
| 2008/0075127 | A1* | 3/2008 | Fourcand | H04J 3/0605 370/509 |
| 2013/0195458 | A1* | 8/2013 | Luo | H04L 41/0896 398/66 |
| 2018/0123717 | A1* | 5/2018 | Luo | H04J 3/0679 |
| 2019/0332503 | A1* | 10/2019 | Yang | G06F 11/2082 |

FOREIGN PATENT DOCUMENTS

| | | |
|---|---|---|
| CN | 103607270 A | 2/2014 |
| CN | 104426772 A | 3/2015 |
| WO | 2008125025 A1 | 10/2008 |

OTHER PUBLICATIONS

Oif et al; Flex Ethernet Implementation Agreement; IA # OIF-FLEXXE-0.1.0; Mar. 2016, pp. 1-31. (Year: 2016).*

International Search Report for corresponding application PCT/CN2017/100006 filed Aug. 31, 2017; dated Nov. 23, 2017.

European Search Report for corresponding application EP17845530; Report dated Aug. 14, 2019.

Sebastien Gareau, "G. 709.1 Draft Text v0. 19; CD11-F01", International Communication Union, Aug. 26, 2016, pp. 1-26, XP044181952.

Stephen Trowbridge: "Flex Ethernet Implentation Agreement 1.0 IA # OIF Flexe 01.0", Optical Internetworking Forum, Mar. 1, 2016, pp. 1-31, XP055509044.

* cited by examiner

METHOD, DEVICE AND SYSTEM FOR SYNCHRONIZATION MESSAGE TRANSMISSION

TECHNICAL FIELD

The present disclosure relates, but is not limited, to a wire communication technology, and in particular to a method, device and system for synchronization message transmission.

BACKGROUND

A research of a Flexible Ethernet (FlexE) technology is started by the Optical Internetworking Forum (OIF) of the International Organization for Standardization (ISO) on March 2015, and the related technical documents are voted and accepted on March 2016. A general structure of the FlexE is shown in FIG. 1. A characteristic of the FlexE is that: multiple Ethernet Physical Layer Links (abbreviated as PHYs) with the same rate are bound to transmit a service with a comparatively high Media Access Control (MAC) rate, for example, four Ethernet PHY channels of 100G are bound to support a user service with the MAC rate of 400G, that is, the user service is transmitted in multiple Ethernet PHYs.

The difference between structures of the FlexE and a traditional Ethernet is that the FlexE has an additional FlexE shim between an MAC layer and a Physical Coding Sublayer (PCS). A function of the FlexE shim is building a calendar with a size of 2×n blocks each having a length of 66 bytes (i.e., 20×n 66b blocks), where n is the number of bound Ethernet PHYs, and each 66b block represents one time slot of 5G.

At a multiplexing side, services with different MAC rates may be encapsulated into corresponding numbers of 66b blocks according to a multiple relationship with the 5G. Every twenty 66b blocks form a sub-calendar, and the calendar with the size of 20×n blocks is distributed in n sub-calendars. For each sub-calendar, every 20×1023 66b blocks are correspondingly added with overhead of one 66b block, for storing a related mapping relationship. Each sub-calendar is transmitted in a single Ethernet PHY of 100G.

Correspondingly, at a de-multiplexing side, n sub-calendars may form a calendar with the size of 20×n blocks, and the user services are extracted from the corresponding numbers of 66b blocks according to the mapping relationship stored in the overhead.

SUMMARY

The following is an overview of the subject matter elaborated in this application. The overview is not intended to limit the scope of protection of the claims.

Some embodiments of the present disclosure provide a method, device and system for synchronization message transmission, so as to transmit a synchronization message in the FlexE.

A first embodiment of the present disclosure provides a method for synchronization message transmission, which includes that:

a transmitting end selects from a FlexE group at least one Ethernet PHY for synchronization message transmission;

after encapsulating the synchronization message according to a preset encapsulation strategy, the transmitting end inserts the synchronization message into a synchronization message channel in overhead of the selected Ethernet PHY; and the transmitting end transmits the synchronization message through the selected Ethernet PHY.

In the above solution, the method may further include that:

the transmitting end sets a synchronization indicator in the overhead of the selected Ethernet PHY, wherein the synchronization indicator is used for indicating that there is synchronization message carried in the Ethernet PHY with the synchronization indicator;

correspondingly, when the transmitting end transmits the synchronization message through the selected Ethernet PHY, the method may further include that:

the transmitting end transmits the synchronization indicator through the selected Ethernet PHY.

In the above solution, the method may further include that:

the transmitting end partitions part of or all of reserved bytes of a FlexE overhead into at least one of the synchronization message channel and a synchronization indication, wherein the synchronization indication is used for carrying the synchronization indicator.

In the above solution, the act that the transmitting end partitions part of or all of the reserved bytes of the FlexE overhead into at least one of the synchronization message channel and the synchronization indication may include that:

the transmitting end partitions part of or all of the reserved bytes of the FlexE overhead into the synchronization indication with a size of first preset byte length and the synchronization message channel with a size of second preset byte length.

In the above solution, the act that after encapsulating synchronization message according to a preset encapsulation strategy, the transmitting end inserts the synchronization message into the synchronization message channel in the overhead of the selected Ethernet PHY may include that:

the transmitting end encapsulates the synchronization message according to a Frame mapped Generic Framing Procedure (GFP-F); and the transmitting end inserts the encapsulated synchronization message into the synchronization message channel in the overhead of the selected Ethernet PHY.

In the above solution, the synchronization message may include a Precision Time Protocol (PTP) message.

In the above solution, a generation period of the PTP message satisfies a clock time synchronization requirement.

In the above solution, the act that the transmitting end transmits the synchronization message through the selected Ethernet PHY may include that:

a complete PTP message is transmitted through N FlexE overhead frames in the selected Ethernet PHY.

A second embodiment of the present disclosure provides a method for synchronization message transmission, which includes that:

the transmitting end selects from a FlexE group at least one Ethernet PHY for synchronization message transmission;

after encapsulating an original synchronization message according to the preset encapsulation strategy, the transmitting end inserts the original synchronization message into a synchronization message channel in overhead of the selected Ethernet PHY;

the transmitting end transmits the original synchronization message to an Optical Transport Network (OTN) egress through the selected Ethernet PHY;

the OTN egress determines the selected Ethernet PHY;

the OTN egress performs de-encapsulation from the selected Ethernet PHY to acquire the original synchronization message;

the OTN egress updates the original synchronization message according to time difference of OTN to acquire an updated synchronization message;

after encapsulating the updated synchronization message according to the preset encapsulation strategy, the OTN egress inserts the updated synchronization message into the synchronization message channel in the overhead of the selected Ethernet PHY; and the OTN egress transmits the updated synchronization message through the selected Ethernet PHY.

In the above solution, the method may further include that:

the transmitting end sets the synchronization indicator in the overhead of the selected Ethernet PHY, wherein the synchronization indicator is used for indicating that there is synchronization message carried in the Ethernet PHY with the synchronization indicator;

correspondingly, the act that the OTN egress determines the selected Ethernet PHY may include that: the OTN egress recognizes the synchronization indicator of the Ethernet PHY to determine the selected Ethernet PHY;

correspondingly, when the OTN egress transmits the updated synchronization message through the selected Ethernet PHY, the method may further include that: the OTN egress transmits the synchronization indicator through the selected Ethernet PHY.

In the above solution, the method may further include that:

the transmitting end partitions part of or all of the reserved bytes of the FlexE overhead into at least one of the synchronization message channel and the synchronization indication, wherein the synchronization indication is used for carrying the synchronization indicator.

In the above solution, the act that after encapsulating the synchronization message according to the preset encapsulation strategy, the transmitting end inserts the synchronization message into the synchronization message channel in the overhead of the selected Ethernet PHY may include that:

the transmitting end encapsulates the synchronization message according to the GFP-F; and the transmitting end inserts the encapsulated synchronization message into the synchronization message channel in the overhead of the selected Ethernet PHY.

In the above solution, the synchronization message may include the PTP message.

In the above solution, the generation period of the PTP message satisfies the clock time synchronization requirement.

A third embodiment of the present disclosure provides a method for synchronization message transmission, which includes that:

the transmitting end selects from a FlexE group at least one Ethernet PHY for synchronization message transmission;

after encapsulating an original synchronization message according to a preset encapsulation strategy, the transmitting end inserts the original synchronization message into a synchronization message channel in overhead of the selected Ethernet PHY;

the transmitting end transmits the original synchronization message to the OTN egress through the selected Ethernet PHY;

the OTN egress determines the selected Ethernet PHY;

after encapsulating the time difference of the OTN according to the preset encapsulation strategy, the OTN egress inserts the time difference of the OTN into a management channel of the overhead of the selected Ethernet PHY; and the OTN network egress transmits the original synchronization message and the time difference of the OTN through the selected Ethernet PHY.

In the above solution, the method may further include that: the transmitting end sets the synchronization indicator in the overhead of the selected Ethernet PHY, wherein the synchronization indicator is used for indicating that there is synchronization message carried in the Ethernet PHY with the synchronization indicator;

correspondingly, the act that the OTN egress determines the selected Ethernet PHY may include that: the OTN egress recognizes the synchronization indicator of the Ethernet PHY to determine the selected Ethernet PHY;

correspondingly, when the OTN network egress transmits the original synchronization message and the time difference of the OTN through the selected Ethernet PHY, the method may further include that: the OTN network egress transmits the synchronization indicator through the selected Ethernet PHY.

In the above solution, the method may further include that: the transmitting end partitions part of or all of the reserved bytes of the FlexE overhead into at least one of the synchronization message channel and the synchronization indication, wherein the synchronization indication is used for carrying the synchronization indicator.

In the above solution, the act that after encapsulating the synchronization message according to the preset encapsulation strategy, the transmitting end inserts the synchronization message into the synchronization message channel in the overhead of the selected Ethernet PHY may include that:

the transmitting end encapsulates the synchronization message according to the GFP-F; and the transmitting end inserts the encapsulated synchronization message into the synchronization message channel in the overhead of the selected Ethernet PHY.

A fourth embodiment of the present disclosure provides a method for synchronization message transmission, which may include that:

a receiving end detects from a FlexE group at least one Ethernet PHY for synchronization message transmission;

the receiving end acquires encapsulated synchronization message by parsing from a synchronization message channel in overhead of the Ethernet PHY for synchronization message transmission;

the receiving end acquires the synchronization message from the encapsulated synchronization message through a preset de-encapsulation strategy; and the receiving end performs time synchronization according to the synchronization message.

In the above solution, there is also the synchronization indicator included in the overhead of the Ethernet PHY for synchronization message transmission, wherein the synchronization indicator is used for indicating that there is synchronization message carried in the Ethernet PHY with the synchronization indicator;

correspondingly, that the receiving end detects from the FlexE group the Ethernet PHY for synchronization message transmission may include that:

the receiving end determines from the FlexE group the Ethernet PHY for synchronization message transmission by detecting the synchronization indicator in the Ethernet PHY.

In the above solution, the synchronization message may include the PTP message.

In the above solution, the encapsulated synchronization message is the synchronization message encapsulated according to the GFP-F;

correspondingly, the act that the receiving end acquires the original synchronization message from the encapsulated synchronization message through the preset de-encapsulation strategy may include that:

the receiving end performs de-encapsulation to the encapsulated synchronization message according to the GFP-F to acquire the original synchronization message.

A fifth embodiment of the present disclosure provides a method for synchronization message transmission, which includes that:

the receiving end detects from a FlexE group at least one Ethernet PHY for synchronization message transmission;

the receiving end acquires synchronization message updated by an OTN egress from overhead of the Ethernet PHY for synchronization message transmission; and the receiving end performs time synchronization according to the synchronization message updated by the OTN egress.

A sixth embodiment of the present disclosure provides a method for synchronization message transmission, which includes that:

the receiving end detects from a FlexE group at least one Ethernet PHY for synchronization message transmission;

the receiving end acquires original synchronization message and time difference of OTN from overhead of the Ethernet PHY for synchronization message transmission; and the receiving end performs time synchronization according to the original synchronization message and the time difference of the OTN.

A seventh embodiment of the present disclosure provides a method for synchronization message transmission, which includes that:

the transmitting end selects from a FlexE group at least one Ethernet PHY for synchronization message transmission;

after encapsulating synchronization message according to a preset encapsulation strategy, the transmitting end inserts the synchronization message into a synchronization message channel in overhead of the selected Ethernet PHY;

the transmitting end transmits the synchronization message to the receiving end through the selected Ethernet PHY;

the receiving end detects from the FlexE group the Ethernet PHY for synchronization message transmission;

the receiving end acquires the encapsulated synchronization message by parsing from the synchronization message channel in the overhead of the Ethernet PHY for synchronization message transmission;

the receiving end acquires the synchronization message from the encapsulated synchronization message through the preset de-encapsulation strategy; and the receiving end performs time synchronization according to the synchronization message.

An eighth embodiment of the present disclosure provides a first transmitting end. The first transmitting end includes: a first selecting module, a first inserting module, and a first transmitting module; wherein, the first selecting module is configured to select from a FlexE group at least one Ethernet PHY for synchronization message transmission;

the first inserting module is configured to, after encapsulating synchronization message according to a preset encapsulation strategy, insert the synchronization message into a synchronization message channel in overhead of the selected Ethernet PHY; and the first transmitting module is configured to transmit the synchronization message through the selected Ethernet PHY.

In the above solution, the first transmitting end may further include a first setting module, which is configured to set the synchronization indicator in the overhead of the selected Ethernet PHY, wherein the synchronization indicator is used for indicating that there is synchronization message carried in the Ethernet PHY with the synchronization indicator.

In the above solution, the first transmitting end may further include: a first partitioning module, which is configured to partition part of or all of the reserved bytes of the FlexE overhead into at least one of the synchronization message channel and the synchronization indication, wherein the synchronization indication is used for carrying the synchronization indicator.

In the above solution, the first inserting module is configured to encapsulate the synchronization message according to the GFP-F, and insert the encapsulated synchronization message into the synchronization message channel in the overhead of the selected Ethernet PHY.

A ninth embodiment of the present disclosure provides a second transmitting end. The second transmitting end includes: a second selecting module, a second inserting module, a second transmitting module, and a first OTN egress; wherein, the second selecting module is configured to select from a FlexE group at least one Ethernet PHY for synchronization message transmission;

the second inserting module is configured to, after encapsulating an original synchronization message according to a preset encapsulation strategy, insert the original synchronization message into a synchronization message channel in overhead of the selected Ethernet PHY;

the second transmitting module is configured to transmit the original synchronization message to the first OTN egress through the selected Ethernet PHY;

the first OTN egress is configured to determine the selected Ethernet PHY, and perform de-encapsulation from the selected Ethernet PHY to acquire the original synchronization message, and update the original synchronization message according to time difference of OTN to acquire an updated synchronization message, and after encapsulating the updated synchronization message according to the preset encapsulation strategy, insert the updated synchronization message into the synchronization message channel in the overhead of the selected Ethernet PHY, and transmit the updated synchronization message through the selected Ethernet PHY.

A tenth embodiment of the present disclosure provides a third transmitting end. The third transmitting end includes: a third selecting module, a third inserting module, a third transmitting module, and a second OTN egress; wherein, the third selecting module is configured to select from a FlexE group at least one Ethernet PHY for synchronization message transmission;

the third inserting module is configured to, after encapsulating an original synchronization message according to a preset encapsulation strategy, insert the original synchronization message into a synchronization message channel in overhead of the selected Ethernet PHY;

the third transmitting module is configured to transmit the original synchronization message to the second OTN egress through the selected Ethernet PHY;

the second OTN egress is configured to determine the selected Ethernet PHY, and after encapsulating the time difference of the OTN according to the preset encapsulation strategy, insert the time difference of the OTN into the management channel of the overhead of the selected Ethernet PHY, and transmit the original synchronization message and the time difference of the OTN through the selected Ethernet PHY.

An eleventh embodiment of the present disclosure provides a first receiving end. The first receiving end includes: a first detecting module, a first parsing module, a first de-encapsulation module, and a first synchronization module; wherein, the first detecting module is configured to detect from a FlexE group at least one Ethernet PHY for synchronization message transmission;

the first parsing module is configured to acquire encapsulated synchronization message by parsing from a synchronization message channel in overhead of the Ethernet PHY for synchronization message transmission;

the first de-encapsulation module is configured to acquire synchronization message from the encapsulated synchronization message through a preset de-encapsulation strategy; and the first synchronization module is configured to perform time synchronization according to the synchronization message.

In the above solution, there is also the synchronization indicator included in the overhead of the Ethernet PHY for synchronization message transmission, wherein the synchronization indicator is used for indicating that there is synchronization message carried in the Ethernet PHY with the synchronization indicator;

correspondingly, the first detecting module is configured to determine from the FlexE group the Ethernet PHY for synchronization message transmission by detecting the synchronization indicator in the Ethernet PHY.

In the above solution, the encapsulated synchronization message is the synchronization message encapsulated according to the GFP-F;

correspondingly, the first de-encapsulation module is configured to perform de-encapsulation to the encapsulated synchronization message according to the GFP-F to acquire the original synchronization message.

A twelfth embodiment of the present disclosure provides a second receiving end. The second receiving end includes: a second detecting module, a first acquiring module, and a second synchronization module; wherein, the second detecting module is configured to detect from a FlexE group at least one Ethernet PHY for synchronization message transmission;

the first acquiring module is configured to acquire synchronization message updated by an OTN egress from overhead of the Ethernet PHY for synchronization message transmission; and the second synchronization module is configured to perform time synchronization according to the synchronization message updated by the OTN egress.

A thirteenth embodiment of the present disclosure provides a third receiving end. The third receiving end includes: a third detecting module, a second acquiring module and a third synchronization module; wherein, the third detecting module is configured to detect from a FlexE group at least one Ethernet PHY for synchronization message transmission;

the second acquiring module is configured to acquire original synchronization message and time difference of OTN from overhead of the Ethernet PHY for synchronization message transmission;

the third synchronization module is configured to perform time synchronization according to the original synchronization message and the time difference of the OTN.

A fourteenth embodiment of the present disclosure provides a system for synchronization message transmission. The system includes: a first transmitting end and a first receiving end; wherein, the first transmitting end is configured to select from a FlexE group at least one Ethernet PHY for synchronization message transmission, and after encapsulating synchronization message according to a preset encapsulation strategy, insert the synchronization message into a synchronization message channel in overhead of the selected Ethernet PHY, and transmit the synchronization message through the selected Ethernet PHY;

the first receiving end is configured to detect from the FlexE group the Ethernet PHY for synchronization message transmission, and acquire the encapsulated synchronization message by parsing from the synchronization message channel in the overhead of the Ethernet PHY for synchronization message transmission, and acquire the synchronization message from the encapsulated synchronization message through the preset de-encapsulation strategy, and perform time synchronization according to the synchronization message.

A fifteenth embodiment of the present disclosure provides a system for synchronization message transmission. The system includes: a second transmitting end and a second receiving end; wherein, the second transmitting end is configured to select from a FlexE group at least one Ethernet PHY for synchronization message transmission, and after encapsulating an original synchronization message according to a preset encapsulation strategy, insert the original synchronization message into a synchronization message channel in overhead of the selected Ethernet PHY, and transmit the original synchronization message to the first OTN egress through the selected Ethernet PHY;

the first OTN egress is configured to determine the selected Ethernet PHY, and perform de-encapsulation from the selected Ethernet PHY to acquire the original synchronization message, and update the original synchronization message according to the time difference of the OTN to acquire an updated synchronization message, and after encapsulating the updated synchronization message according to the preset encapsulation strategy, insert the updated synchronization message into the synchronization message channel in the overhead of the selected Ethernet PHY, and transmit the updated synchronization message through the selected Ethernet PHY;

the second receiving end is configured to detect from the FlexE group the Ethernet PHY for synchronization message transmission, and acquire the synchronization message updated by the OTN egress from the overhead of the Ethernet PHY for synchronization message transmission, and perform time synchronization according to the synchronization message updated by the OTN egress.

A sixteenth embodiment of the present disclosure provides a system for synchronization message transmission. The system includes: a third transmitting end and a third receiving end; wherein, the third transmitting end is configured to select from a FlexE group at least one Ethernet PHY for synchronization message transmission, and after encapsulating an original synchronization message according to a preset encapsulation strategy, insert the original synchronization message into a synchronization message channel in overhead of the selected Ethernet PHY, and transmit the original synchronization message to the second OTN egress through the selected Ethernet PHY;

the second OTN egress is configured to determine the selected Ethernet PHY, and after encapsulating the time difference of the OTN according to the preset encapsulation strategy, insert the synchronization message into the management channel of the overhead of the selected Ethernet PHY, and transmit the original synchronization message and the time difference of the OTN through the selected Ethernet PHY;

the third receiving end is configured to detect from the FlexE group the Ethernet PHY for synchronization message transmission, and acquire the original synchronization message and the time difference of the OTN from the overhead of the Ethernet PHY for synchronization message transmission, and perform time synchronization according to the original synchronization message and the time difference of the OTN.

With the method, device and system for synchronization message transmission provided by some embodiments of the present disclosure, at least one Ethernet PHY is selected from a FlexE group in a FlexE structure to transmit the synchronization message, thereby implementing the transmission of the synchronization message in the FlexE.

Other aspects can be understood after the accompanying drawings and detailed descriptions are read and understood.

DETAILED DESCRIPTION OF THE EMBODIMENTS

The technical solutions in the embodiments of the present disclosure are clearly and thoroughly described below in combination with the accompanying drawings.

In a synchronization network, at least one of frequency synchronization and time synchronization between network element devices may need to be achieved, that is, at least one of frequency deviation and time deviation between the network element devices should be kept in a limited range. A method used in related technologies is that the network element devices achieve synchronization by synchronization message transmission to each other, for example, a PTP (namely an IEEE 1588 time protocol) and a Synchronous Status Message (SSM).

Based on structural differences between the FlexE and a traditional Ethernet, a method for synchronization message transmission applicable to a FlexE structure has not been presented.

In an embodiment of the present disclosure, at least one Ethernet PHY is selected from a FlexE group in the FlexE structure to transmit the synchronization message, thereby implementing the transmission of the synchronization message in the FlexE. It is to be noted that the FlexE group is the group formed by binding a number of Ethernet PHYs.

Figure 2:
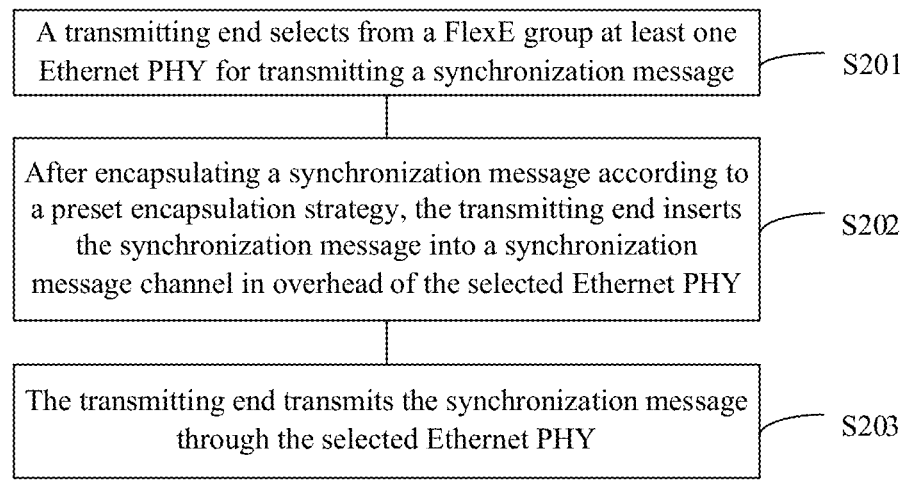
FIG. 2 is a flowchart of a method for synchronization message transmission provided by an embodiment of the present disclosure.

Referring to FIG. 2, a method for synchronization message transmission provided by an embodiment of the present disclosure is shown. The method is applied to a transmitting end of the FlexE, and may include the following acts.

At S201, the transmitting end selects from a FlexE group at least one Ethernet PHY for synchronization message transmission.

At S202, after encapsulating synchronization message according to a preset encapsulation strategy, the transmitting end inserts the synchronization message into a synchronization message channel in overhead of the selected Ethernet PHY.

At S203, the transmitting end transmits the synchronization message through the selected Ethernet PHY.

Figure 1:
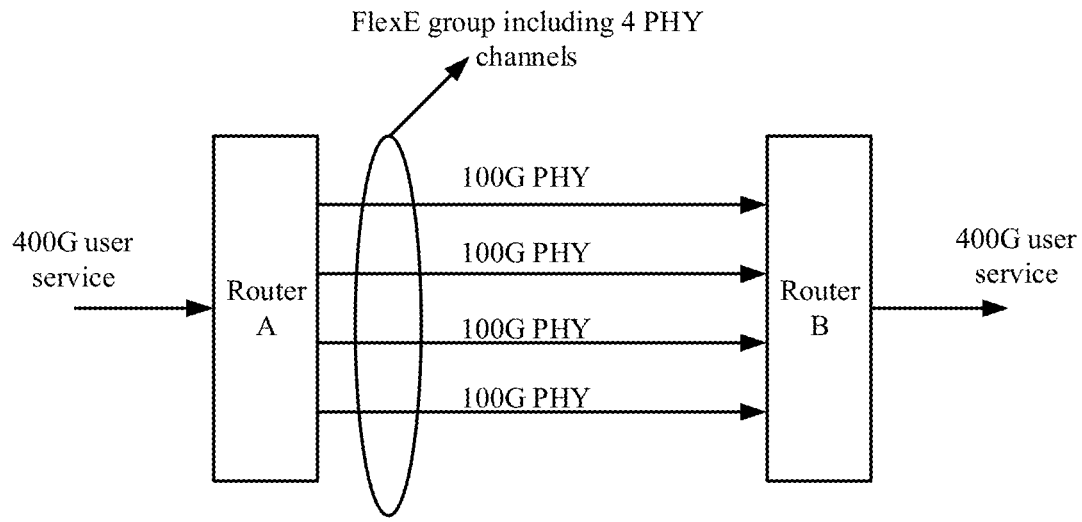
FIG. 1 is a network structure diagram of a FlexE.

For the method shown in FIG. 2, it is to be noted that the method may be applied to a general structure of the FlexE shown in FIG. 1. As an exemplary embodiment, the transmitting end is a router A shown in FIG. 1.

As an exemplary embodiment, the method shown in FIG. 2 may further include that:

the transmitting end sets a synchronization indicator in the overhead of the selected Ethernet PHY, wherein the synchronization indicator is used for indicating that there is synchronization message carried in the Ethernet PHY with the synchronization indicator;

correspondingly, when the transmitting end transmits the synchronization message through the selected Ethernet PHY, the method may further include that:

the transmitting end transmits the synchronization indicator through the selected Ethernet PHY.

As an exemplary embodiment, before the transmitting end sets the synchronization indicator in the overhead of the selected Ethernet PHY, the method may further include that:

the transmitting end partitions part of or all of the reserved bytes of the FlexE overhead into at least one of the synchronization message channel and the synchronization indication, wherein the synchronization indication is used for carrying the synchronization indicator.

In an exemplary implementation process, the transmitting end may partition part of or all of the reserved bytes in the first line of the FlexE overhead into the synchronization indication with the size of first preset byte length and the synchronization message channel with the size of second preset byte length. As an example, each overhead frame of the selected Ethernet PHY only transmits the synchronization indication with the size of the first byte length and synchronization message bytes whose number is the second byte length.

Moreover, values in the synchronization indication and the synchronization message channel may be set as default, for example, the default value is 0.

Figure 3:
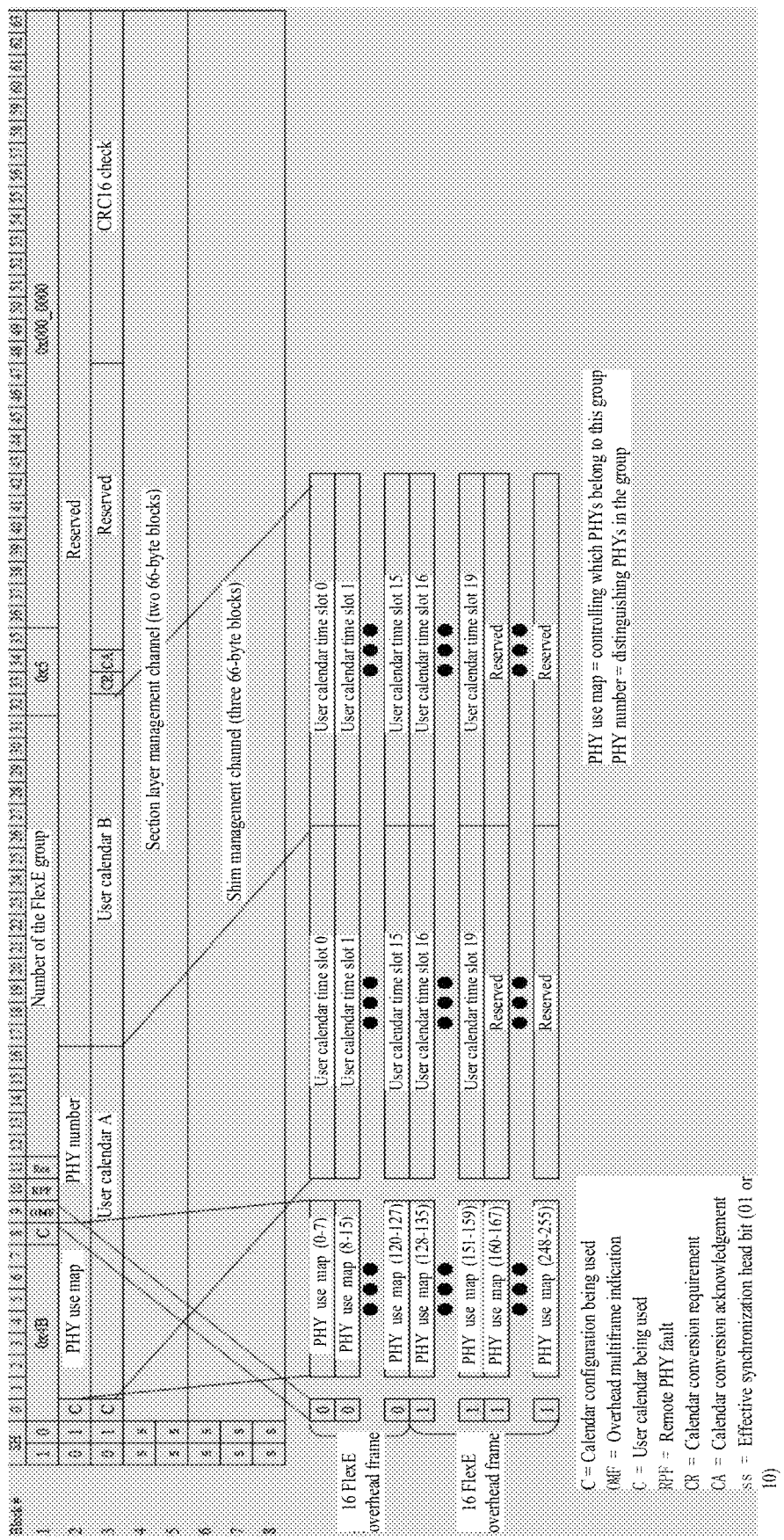
FIG. 3 is a structure diagram of a FlexE overhead provided by an embodiment of the present disclosure.
Figure 4:
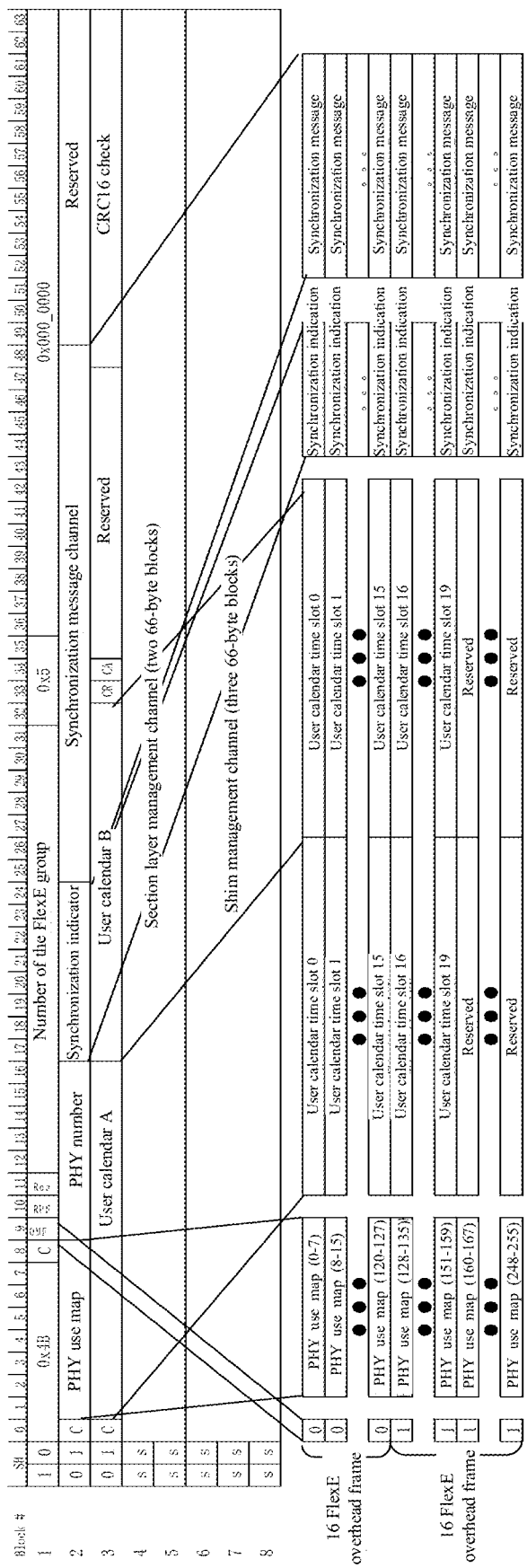
FIG. 4 is a structure diagram of another FlexE overhead provided by an embodiment of the present disclosure.

In particular, the structure of the FlexE overhead is shown in FIG. 3. The router A may partition part of or all of the reserved bytes in the second line of the FlexE overhead into two areas. One of the two areas is the synchronization indication with the size of 1 byte, the other is the synchronization message channel with the size of 3 bytes, and the default values of the two areas are 0. A new FlexE overhead obtained after partition is shown in FIG. 4.

In an exemplary embodiment, the act that the transmitting end sets the synchronization indicator in the overhead of the selected Ethernet PHY may include that: the transmitting end sets the synchronization indication in the overhead of the selected Ethernet PHY to 1.

Understandably, no operation is performed to the synchronization indication in the overhead of other Ethernet PHYs not selected.

It is to be noted that besides indicating the Ethernet PHY carrying the synchronization message through the synchronization indicator, the transmitting end may also preset through a network system, or negotiate with the receiving end agreed Ethernet PHY indicators. The transmitting end may select the Ethernet PHY for synchronization message transmission and indicate the corresponding Ethernet PHY indicator so as to indicate the Ethernet PHY carrying the synchronization message, and the receiving end may determine the Ethernet PHY carrying the synchronization message through the indicated Ethernet PHY indicator and the preset or agreed Ethernet PHY indicator.

In an exemplary embodiment, the act that after encapsulating the synchronization message according to the preset encapsulation strategy, the transmitting end inserts the synchronization message into the synchronization message channel in the overhead of the selected Ethernet PHY may include that:

the transmitting end encapsulates the synchronization message according to GFP-F; and the transmitting end inserts the encapsulated synchronization message into the synchronization message channel in the overhead of the selected Ethernet PHY.

Understandably, no operation is performed to the synchronization message channel in the overhead of the other Ethernet PHYs not selected.

As an exemplary embodiment, the synchronization message may include the PTP message. As an exemplary embodiment, the generation period of the PTP message satisfies the clock time synchronization requirement.

As an exemplary embodiment, the generation period of the PTP message which satisfies the clock time synchronization requirement is consistent with a period of FlexE overhead multiframe. Correspondingly, the act that the transmitting end transmits the synchronization message through the selected Ethernet PHY may include that:

a complete PTP message is transmitted through N FlexE overhead frames in the selected Ethernet PHY. In the embodiment, the N may be 32.

Correspondingly, the generation period of the PTP message is consistent with the period of the FlexE overhead multiframe, that is, every 32 FlexE overhead frames generate a PTP message.

Understandably, the above process may be applied to the general structure of the FlexE shown in FIG. 1. In the general structure, a transport network is only composed of the routers as network element devices, so the transport network may be called a pure flexible Ethernet.

In the method for synchronization message transmission provided by the embodiment, at least one Ethernet PHY is selected from a FlexE group in the FlexE structure to transmit the synchronization message, thereby implementing the transmission of the synchronization message in the FlexE.

The above embodiment may be applied to the pure FlexE. For a situation of FlexE over non-Ethernet network, in the embodiment, by taking that the non-Ethernet network is the OTN for example, namely in a network environment of FlexE over OTN, it is also needed to apply at the OTN egress the time difference of the OTN to the whole transport network. Referring to the FlexE over OTN structure shown in FIG. 5, the embodiment provides a method for synchronization message transmission. Referring to FIG. 6, the method includes the following acts.

At S601, a transmitting end selects from a FlexE group at least one Ethernet PHY for synchronization message transmission.

At S602, after encapsulating an original synchronization message according to a preset encapsulation strategy, the transmitting end inserts the original synchronization message into a synchronization message channel in overhead of the selected Ethernet PHY.

At S603, the transmitting end transmits the original synchronization message to an OTN egress through the selected Ethernet PHY.

At S604, the OTN egress determines the selected Ethernet PHY.

At S605, the OTN egress performs de-encapsulation from the selected Ethernet PHY to acquire the original synchronization message.

At S606, the OTN egress updates the original synchronization message according to time difference of OTN to acquire an updated synchronization message.

At S607, after encapsulating the updated synchronization message according to the preset encapsulation strategy, the OTN egress inserts the updated synchronization message into the synchronization message channel in the overhead of the selected Ethernet PHY.

At S608, the OTN egress transmits the updated synchronization message through the selected Ethernet PHY.

It is to be noted that in the embodiment, the acts S601-S603 are the same as the acts S201-S203 in the above embodiment, so they will not be repeated here.

As an exemplary embodiment, the method shown in FIG. 6 may also include that:

the transmitting end sets the synchronization indicator in the overhead of the selected Ethernet PHY, wherein the synchronization indicator is used for indicating that there is synchronization message carried in the Ethernet PHY with the synchronization indicator;

correspondingly, the act that the OTN egress determines the selected Ethernet PHY in S604 may include that: the OTN egress recognizes the synchronization indicator of the Ethernet PHY to determine the selected Ethernet PHY;

correspondingly, when the OTN egress transmits the updated synchronization message through the selected Ethernet PHY in S608, the method may further include that: the OTN egress transmits the synchronization indicator through the selected Ethernet PHY.

As an exemplary embodiment, before the transmitting end sets the synchronization indicator in the overhead of the selected Ethernet PHY, the method may further include that:

the transmitting end partitions part of or all of the reserved bytes of the FlexE overhead into at least one of the synchronization message channel and the synchronization indication, wherein the synchronization indication is used for carrying the synchronization indicator.

The specific process of partitioning and setting is as described in the embodiment of FIG. 2, so it will not be repeated in this embodiment.

In an exemplary embodiment, the act that the transmitting end sets the synchronization indicator in the overhead of the selected Ethernet PHY may include that: the transmitting end sets the synchronization indication in the overhead of the selected Ethernet PHY to 1.

Understandably, no operation is performed to the synchronization indication in the overhead of other Ethernet PHYs not selected.

It is to be noted that besides indicating the Ethernet PHY carrying the synchronization message through the synchronization indicator, the transmitting end may also preset through the network system, or negotiate with the receiving end the agreed Ethernet PHY indicators. The transmitting end may select the Ethernet PHY for synchronization message transmission and indicate the corresponding Ethernet PHY indicator so as to indicate the Ethernet PHY carrying the synchronization message, and the receiving end may determine the Ethernet PHY carrying the synchronization message through the indicated Ethernet PHY indicator and the preset or agreed Ethernet PHY indicator.

In an exemplary embodiment, the act that after encapsulating the synchronization message according to the preset encapsulation strategy, the transmitting end inserts the synchronization message into the synchronization message channel in the overhead of the selected Ethernet PHY may include that:

the transmitting end encapsulates the synchronization message according to GFP-F; and the transmitting end inserts the encapsulated synchronization message into the synchronization message channel in the overhead of the selected Ethernet PHY.

Understandably, no operation is performed to the synchronization message channel in the overhead of the other Ethernet PHYs not selected.

As an exemplary embodiment, the synchronization message may include the PTP message. As an exemplary embodiment, the generation period of the PTP message satisfies the clock time synchronization requirement.

The specific implement process of the above example is as described in the above embodiment, so it will not be repeated in this embodiment.

The embodiment of FIG. 2 may be applied to the pure FlexE. The embodiment of FIG. 6 may be applied to the FlexE over non-Ethernet network. By taking that the non-Ethernet network is the OTN for example, namely in the network environment of FlexE over OTN, it is also needed to apply at the OTN egress the time difference of the OTN to the whole transport network.

Figure 5:
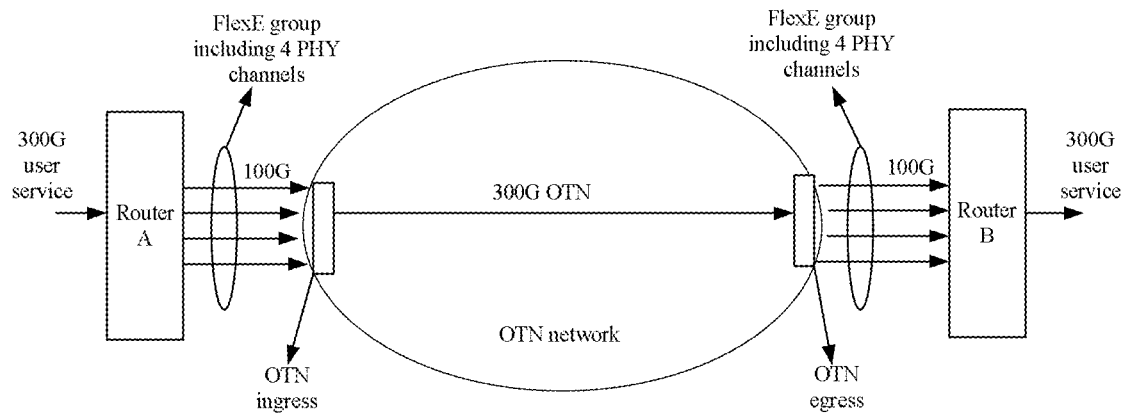
FIG. 5 is a schematic diagram of a FlexE over OTN structure provided by an embodiment of the present disclosure.
Figure 6:
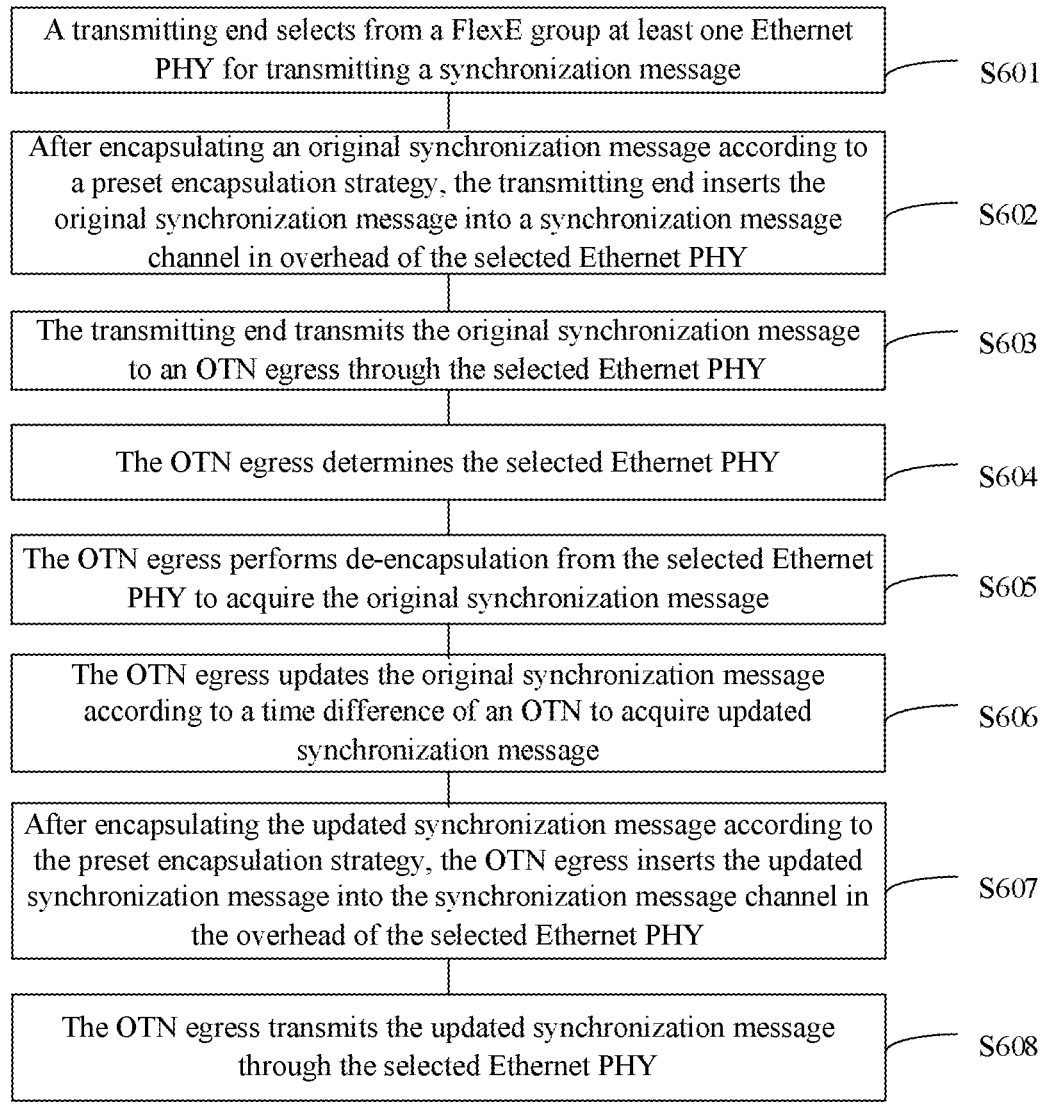
FIG. 6 is a flowchart of a method for synchronization message transmission aiming at the FlexE over OTN structure provided by an embodiment of the present disclosure.
Figure 7:
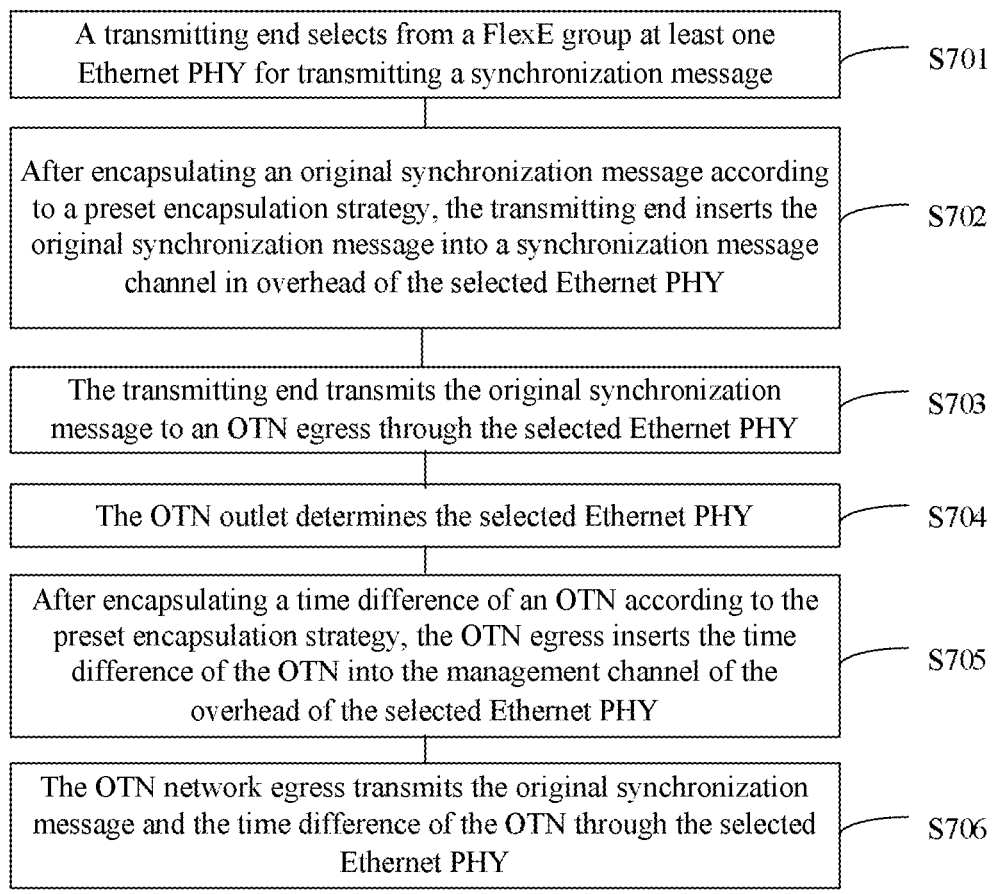
FIG. 7 is a flowchart of another method for synchronization message transmission aiming at the FlexE over OTN structure provided by an embodiment of the present disclosure.

By taking the FlexE over OTN structure shown in FIG. 5 for example, the embodiment provides a method for synchronization message transmission. Referring to FIG. 7, the method includes the following acts.

At S701, the transmitting end selects from a FlexE group at least one Ethernet PHY for synchronization message transmission.

At S702, after encapsulating an original synchronization message according to a preset encapsulation strategy, the transmitting end inserts the original synchronization message into a synchronization message channel in overhead of the selected Ethernet PHY.

At S703, the transmitting end transmits the original synchronization message to the OTN egress through the selected Ethernet PHY.

At S704, the OTN egress determines the selected Ethernet PHY.

At S705, after encapsulating the time difference of the OTN according to the preset encapsulation strategy, the OTN egress inserts the time difference of the OTN into the management channel of the overhead of the selected Ethernet PHY.

At S706, the OTN network egress transmits the original synchronization message and the time difference of the OTN through the selected Ethernet PHY.

It is to be noted that in the embodiment, the acts S701-S703 are the same as the acts S201-S203 in the embodiment of FIG. 2, so they will not be repeated here.

As an exemplary embodiment, the method shown in FIG. 7 may also include that:

the transmitting end sets the synchronization indicator in the overhead of the selected Ethernet PHY, wherein the synchronization indicator is used for indicating that there is synchronization message carried in the Ethernet PHY with the synchronization indicator;

correspondingly, the act that the OTN egress determines the selected Ethernet PHY in S704 may include that: the OTN egress recognizes the synchronization indicator of the Ethernet PHY to determine the selected Ethernet PHY;

correspondingly, when the OTN egress transmits the original synchronization message and the time difference of the OTN through the selected Ethernet PHY in S706, the method may further include that: the OTN egress transmits the synchronization indicator through the selected Ethernet PHY.

As an exemplary embodiment, before the transmitting end sets the synchronization indicator in the overhead of the selected Ethernet PHY, the method may further include that:

the transmitting end partitions part of or all of the reserved bytes of the FlexE overhead into at least one of the synchronization message channel and the synchronization indication, wherein the synchronization indication is used for carrying the synchronization indicator.

The specific process of partitioning and setting is as described in the embodiment of FIG. 2, so it will not be repeated in this embodiment.

In an exemplary embodiment, the act that the transmitting end sets the synchronization indicator in the overhead of the selected Ethernet PHY may include that: the transmitting end sets the synchronization indication in the overhead of the selected Ethernet PHY to 1.

Understandably, no operation is performed to the synchronization indication in the overhead of the other Ethernet PHYs not selected.

It is to be noted that besides indicating the Ethernet PHY carrying the synchronization message through the synchronization indicator, the transmitting end may also preset through the network system, or negotiate with the receiving end the agreed Ethernet PHY indicators. The transmitting end may select the Ethernet PHY for synchronization message transmission and indicate the corresponding Ethernet PHY indicator so as to indicate the Ethernet PHY carrying the synchronization message, and the receiving end may determine the Ethernet PHY carrying the synchronization message through the indicated Ethernet PHY indicator and the preset or agreed Ethernet PHY indicator.

In an exemplary embodiment, the act that after encapsulating the synchronization message according to the preset encapsulation strategy, the transmitting end inserts the synchronization message into the synchronization message channel in the overhead of the selected Ethernet PHY may include that:

the transmitting end encapsulates the synchronization message according to GFP-F; and the transmitting end inserts the encapsulated synchronization message into the synchronization message channel in the overhead of the selected Ethernet PHY.

Understandably, no operation is performed to the synchronization message channel in the overhead of the other Ethernet PHYs not selected.

As an exemplary embodiment, the synchronization message may include the PTP message. As an exemplary embodiment, the generation period of the PTP message satisfies the clock time synchronization requirement.

The specific implement process of the above example is as described in the embodiment of FIG. 2, so it will not be repeated in this embodiment.

Figure 8:
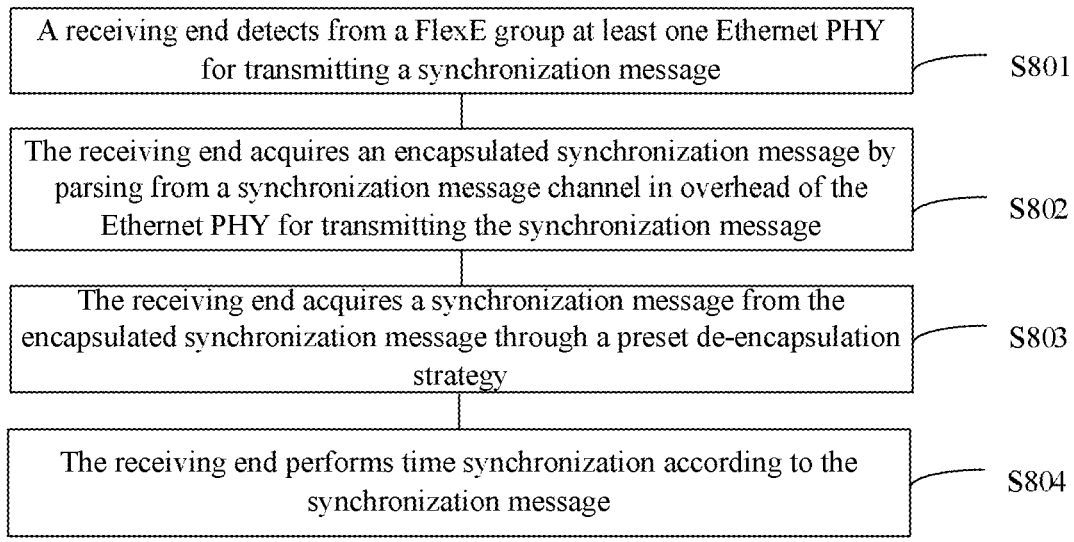
FIG. 8 is a flowchart of a method for synchronization message transmission which is applied to a receiving end and provided by an embodiment of the present disclosure.

FIG. 8 shows a method for synchronization message transmission provided by an embodiment of the present disclosure. The method is applied to the receiving end of the pure FlexE shown in FIG. 1, so the receiving end to which the method of the embodiment is applied corresponds to the transmitting end in the embodiment of FIG. 2. The method includes the following acts.

At S801, the receiving end detects from a FlexE group at least one Ethernet PHY for synchronization message transmission.

At S802, the receiving end acquires encapsulated synchronization message by parsing from a synchronization message channel in overhead of the Ethernet PHY for synchronization message transmission.

At S803, the receiving end acquires synchronization message from the encapsulated synchronization message through a preset de-encapsulation strategy.

At S804, the receiving end performs time synchronization according to the synchronization message.

As an exemplary embodiment, there is also the synchronization indicator included in the overhead of the Ethernet PHY for synchronization message transmission, wherein the synchronization indicator is used for indicating that there is synchronization message carried in the Ethernet PHY with the synchronization indicator. So, the synchronization flat bit and the synchronization message channel may be included in the overhead of the Ethernet PHY, wherein the values of the synchronization flat bit and the synchronization message channel are set to 0 by default;

correspondingly, the synchronization indicator is the synchronization indication in the overhead of the Ethernet PHY and set to 1.

As an exemplary embodiment, the structure of the overhead of the Ethernet PHY added with the synchronization indication and the synchronization message channel may be as shown in FIG. 4, and it will not be repeated in this embodiment.

Correspondingly, the act that the receiving end detects from the FlexE group the Ethernet PHY for synchronization message transmission in S801 may include that:

the receiving end determines from the FlexE group the Ethernet PHY for synchronization message transmission by detecting the synchronization indicator in the Ethernet PHY.

It is to be noted that, as described in the above embodiment, besides indicating the Ethernet PHY carrying the synchronization message through the synchronization indicator, the transmitting end may also preset through a network system, or negotiate with the receiving end agreed Ethernet PHY indicators. The transmitting end may select the Ethernet PHY for synchronization message transmission and indicate the corresponding Ethernet PHY indicator so as to indicate the Ethernet PHY carrying the synchronization message, and the receiving end may determine the Ethernet PHY carrying the synchronization message through the indicated Ethernet PHY indicator and the preset or agreed Ethernet PHY indicator.

As an exemplary embodiment, the synchronization message may include the PTP message.

As an exemplary embodiment, the encapsulated synchronization message is the synchronization message encapsulated according to the GFP-F;

correspondingly, the act that the receiving end acquires the original synchronization message from the encapsulated synchronization message through the preset de-encapsulation strategy may include that:

the receiving end performs de-encapsulation to the encapsulated synchronization message according to the GFP-F to acquire the original synchronization message.

In the method for synchronization message transmission provided by the embodiment, the receiving end acquires the Ethernet PHY for transmitting a synchronization signal by parsing from the FlexE group, and acquires the synchronization message from the synchronization signal, thereby implementing the transmission of the synchronization message in the FlexE structure.

Figure 9:
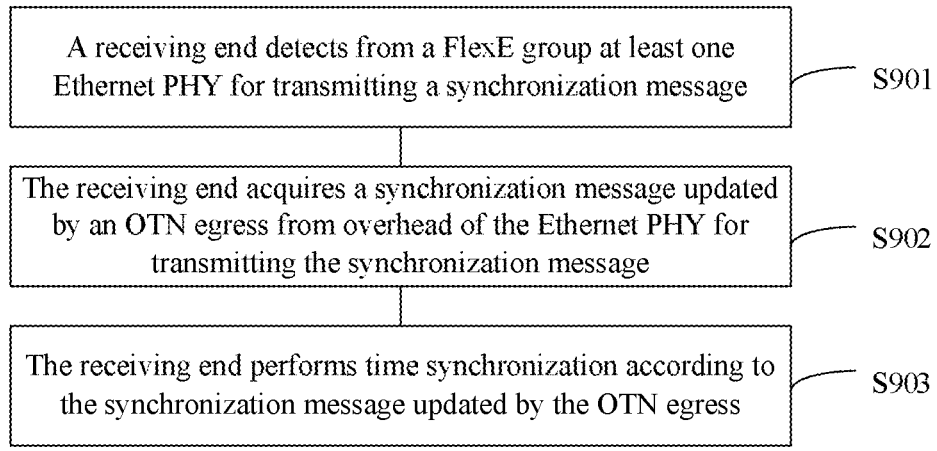
FIG. 9 is a flowchart of another method for synchronization message transmission which is applied to the receiving end and provided by an embodiment of the present disclosure.

The embodiment of FIG. 8 may be applied to the router B shown in FIG. 1. For the situation of FlexE over non-Ethernet network, by taking the OTN for example, namely in the network environment of FlexE over OTN, it is also needed to apply at the OTN egress the time difference of the OTN to the whole transport network. FIG. 9 shows a method for synchronization message transmission provided by an embodiment of the present disclosure, and the receiving end to which this embodiment is applied corresponds to the transmitting end described in the embodiment of FIG. 6, so, aiming at the receiving end, namely the router B shown in FIG. 5, the method includes the following acts.

At S901, the receiving end detects from a FlexE group at least one Ethernet PHY for synchronization message transmission.

At S902, the receiving end acquires synchronization message updated by an OTN egress from overhead of the Ethernet PHY for synchronization message transmission.

At S903, the receiving end performs time synchronization according to the synchronization message updated by the OTN egress.

As an exemplary embodiment, there is also the synchronization indicator included in the overhead of the Ethernet PHY for synchronization message transmission, wherein the synchronization indicator is used for indicating that there is synchronization message carried in the Ethernet PHY with the synchronization indicator. So, the synchronization flat bit and the synchronization message channel may be included in the overhead of the Ethernet PHY, wherein the values of the synchronization flat bit and the synchronization message channel are set to 0 by default;

correspondingly, the synchronization indicator is the synchronization indication in the overhead of the Ethernet PHY and set to 1.

As an exemplary embodiment, the structure of the overhead of the Ethernet PHY added with the synchronization indication and the synchronization message channel may be as shown in FIG. 4, and it will not be repeated in this embodiment.

Correspondingly, the act that the receiving end detects from the FlexE group the Ethernet PHY for synchronization message transmission in S901 may include that:

the receiving end determines from the FlexE group the Ethernet PHY for synchronization message transmission by detecting the synchronization indicator in the Ethernet PHY.

It is to be noted that, as described in the above embodiment, besides indicating the Ethernet PHY carrying the synchronization message through the synchronization indicator, the transmitting end may also preset through a network system, or negotiate with the receiving end agreed Ethernet PHY indicators. The transmitting end may select the Ethernet PHY for synchronization message transmission and indicate the corresponding Ethernet PHY indicator so as to indicate the Ethernet PHY carrying the synchronization message, and the receiving end may determine the Ethernet PHY carrying the synchronization message through the indicated Ethernet PHY indicator and the preset or agreed Ethernet PHY indicator.

As an exemplary embodiment, the synchronization message may include the PTP message.

As an exemplary embodiment, the encapsulated synchronization message is the synchronization message encapsulated according to the GFP-F;

correspondingly, the act that the receiving end acquires the original synchronization message from the encapsulated synchronization message through the preset de-encapsulation strategy may include that:

the receiving end performs de-encapsulation to the encapsulated synchronization message according to the GFP-F to acquire the original synchronization message.

Understandably, this embodiment corresponds to the embodiment of FIG. 6.

Figure 10:
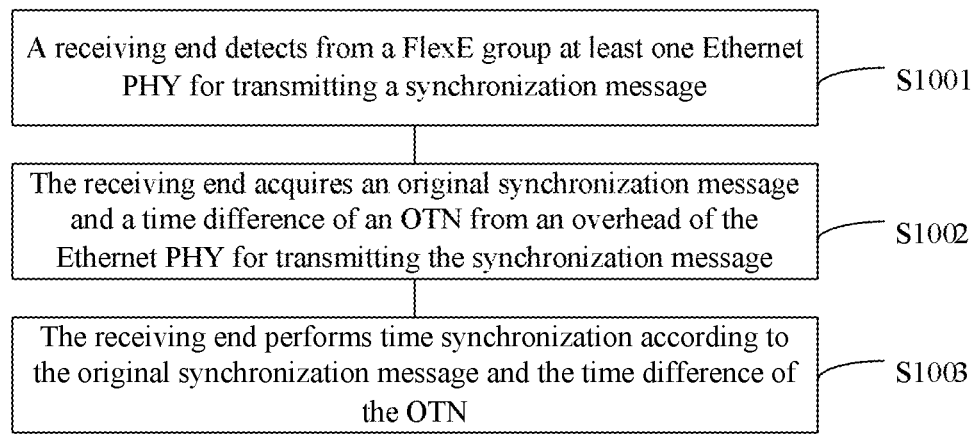
FIG. 10 is a flowchart of yet another method for synchronization message transmission which is applied to the receiving end and provided by an embodiment of the present disclosure.

The embodiment of FIG. 8 may be applied to the router B shown in FIG. 1. For the situation of FlexE over non-Ethernet network, by taking the OTN for example, namely in the network environment of FlexE over OTN, it is also needed to apply at the OTN egress the time difference of the OTN to the whole transport network. FIG. 10 shows a method for synchronization message transmission provided by an embodiment of the present disclosure, and the receiving end to which this embodiment is applied corresponds to the transmitting end described in the embodiment of FIG. 7, so, aiming at the receiving end, namely the router B shown in FIG. 5, the method includes the following acts.

At S1001, the receiving end detects from a FlexE group at least one Ethernet PHY for synchronization message transmission.

At S1002, the receiving end acquires original synchronization message and time difference of OTN from overhead of the Ethernet PHY for synchronization message transmission.

At S1003, the receiving end performs time synchronization according to the original synchronization message and the time difference of the OTN.

As an exemplary embodiment, there is also the synchronization indicator included in the overhead of the Ethernet PHY for synchronization message transmission, wherein the synchronization indicator is used for indicating that there is synchronization message carried in the Ethernet PHY with the synchronization indicator. So, the synchronization flat bit and the synchronization message channel may be included in the overhead of the Ethernet PHY, wherein the values of the synchronization flat bit and the synchronization message channel are set to 0 by default;

correspondingly, the synchronization indicator is the synchronization indication in the overhead of the Ethernet PHY and set to 1.

As an exemplary embodiment, the structure of the overhead of the Ethernet PHY added with the synchronization indication and the synchronization message channel may be as shown in FIG. 4, and it will not be repeated in this embodiment.

Correspondingly, the act that the receiving end detects from the FlexE group the Ethernet PHY for synchronization message transmission in S1001 may include that:

the receiving end determines from the FlexE group the Ethernet PHY for synchronization message transmission by detecting the synchronization indicator in the Ethernet PHY.

It is to be noted that, as described in the above embodiment, besides indicating the Ethernet PHY carrying the synchronization message through the synchronization indicator, the transmitting end may also preset through a network system, or negotiate with the receiving end agreed Ethernet PHY indicators. The transmitting end may select the Ethernet PHY for synchronization message transmission and indicate the corresponding Ethernet PHY indicator so as to indicate the Ethernet PHY carrying the synchronization message, and the receiving end may determine the Ethernet PHY carrying the synchronization message through the indicated Ethernet PHY indicator and the preset or agreed Ethernet PHY indicator.

As an exemplary embodiment, the synchronization message may include the PTP message.

As an exemplary embodiment, the encapsulated synchronization message is the synchronization message encapsulated according to the GFP-F;

correspondingly, the act that the receiving end acquires the original synchronization message from the encapsulated synchronization message through the preset de-encapsulation strategy may include that:

the receiving end performs de-encapsulation to the encapsulated synchronization message according to the GFP-F to acquire the original synchronization message.

Understandably, this embodiment corresponds to the embodiment of FIG. 7.

It is to be noted that, in combination with the above embodiments, the present disclosure also provides a method for synchronization message transmission, which is applied to the transmitting end and the receiving end. The method includes that:

the transmitting end selects from a FlexE group at least one Ethernet PHY for synchronization message transmission;

after encapsulating synchronization message according to a preset encapsulation strategy, the transmitting end inserts the synchronization message into a synchronization message channel in overhead of the selected Ethernet PHY;

the transmitting end transmits the synchronization message to the receiving end through the selected Ethernet PHY;

the receiving end detects from the FlexE group the Ethernet PHY for synchronization message transmission;

the receiving end acquires the encapsulated synchronization message by parsing from the synchronization message channel in the overhead of the Ethernet PHY for synchronization message transmission;

the receiving end acquires the synchronization message from the encapsulated synchronization message through the preset de-encapsulation strategy; and the receiving end performs time synchronization according to the synchronization message.

The above embodiments are illustrated below through three application examples.

Application Example 1

Figure 11:
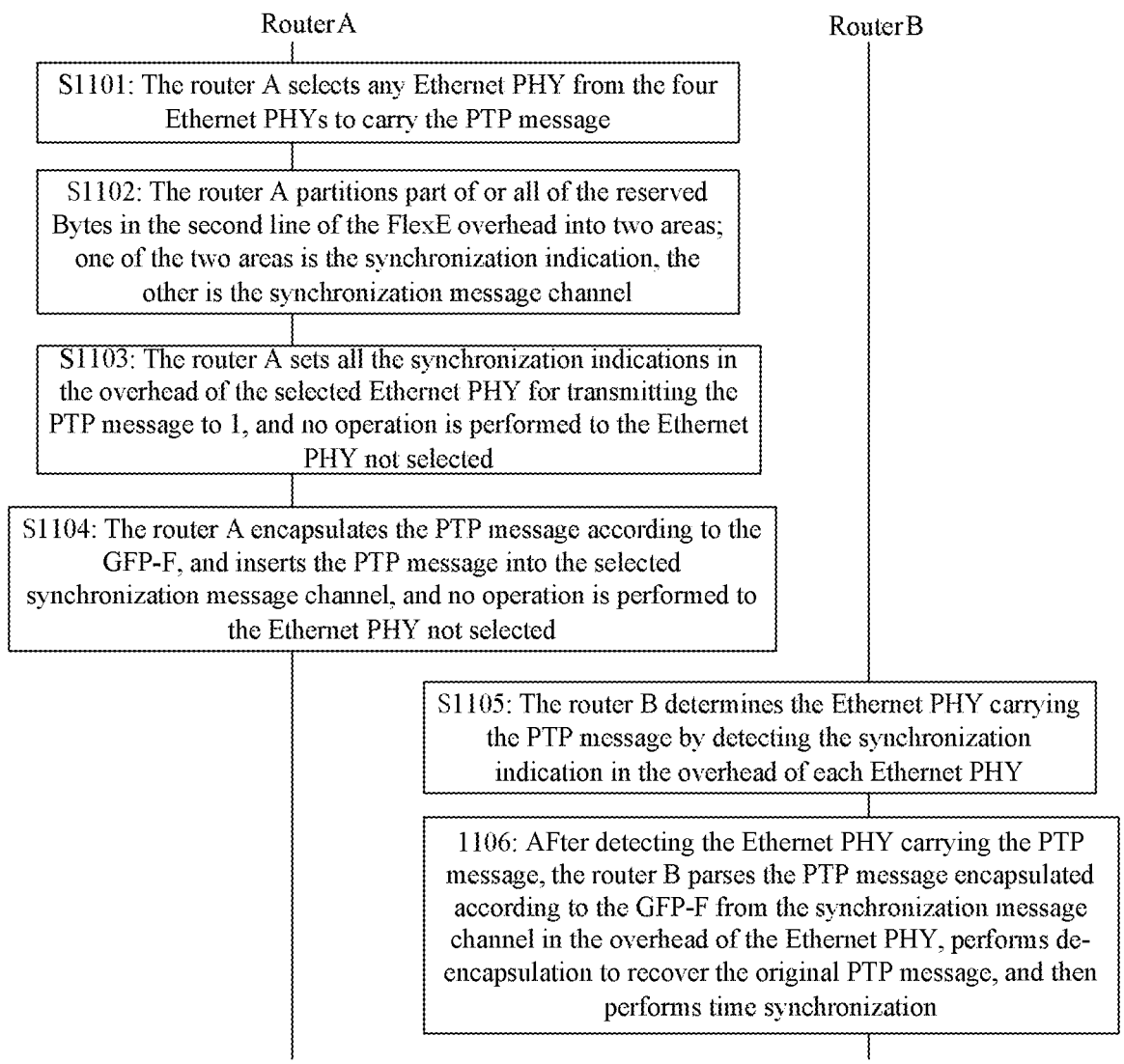
FIG. 11 is a flowchart of a specific embodiment of the present disclosure.

The application example takes the pure FlexE composed of the two routers shown in FIG. 1 as an application scenario, in which a 400G user service needs to be transmitted from the router A to the router B, and the rate of each Ethernet PHY is 100G, so the service of 400G may be carried by four Ethernet PHYs; here, four Ethernet PHYs are included in the FlexE group, and the synchronization message is the PTP message. Referring to FIG. 11, the flow may include the following acts.

At S1101, the router A selects any Ethernet PHY from the four Ethernet PHYs to carry the PTP message.

At S1102, the router A partitions part of or all of the reserved bytes in the second line of the FlexE overhead into two areas; one of the two areas is the synchronization indication with the size of 1 byte, the other is the synchronization message channel with the size of 3 bytes.

As an exemplary embodiment, the structure of the FlexE overhead after partition is shown in FIG. 4, and the default values of the two areas are 0.

At S1103, the router A sets all the synchronization indications in the overhead of the selected Ethernet PHY for transmitting the PTP message to 1, and no operation is performed to the Ethernet PHY not selected.

At S1104, the router A encapsulates the PTP message according to the GFP-F, and inserts the PTP message into the synchronization message channel in the overhead of the selected Ethernet PHY for transmitting the PTP message, and no operation is performed to the Ethernet PHY not selected.

The generation period of the PTP message is consistent with the period of the FlexE overhead multiframe, that is, every 32 FlexE overhead frames generate a PTP message.

At S1105, the router B determines the Ethernet PHY carrying the PTP message by detecting the synchronization indication in the overhead of each Ethernet PHY.

At S1106, after detecting the Ethernet PHY carrying the PTP message, the router B parses the PTP message encapsulated according to the GFP-F from the synchronization message channel in the overhead of the Ethernet PHY, performs de-encapsulation according to the GFP-F to recover the original PTP message, and then performs time synchronization according to the PTP message.

As an exemplary embodiment, the router A in the application example corresponds to the transmitting end in the embodiment of FIG. 2, and the router B corresponds to the receiving end in the embodiment of FIG. 8.

Application Example 2

Figure 12:
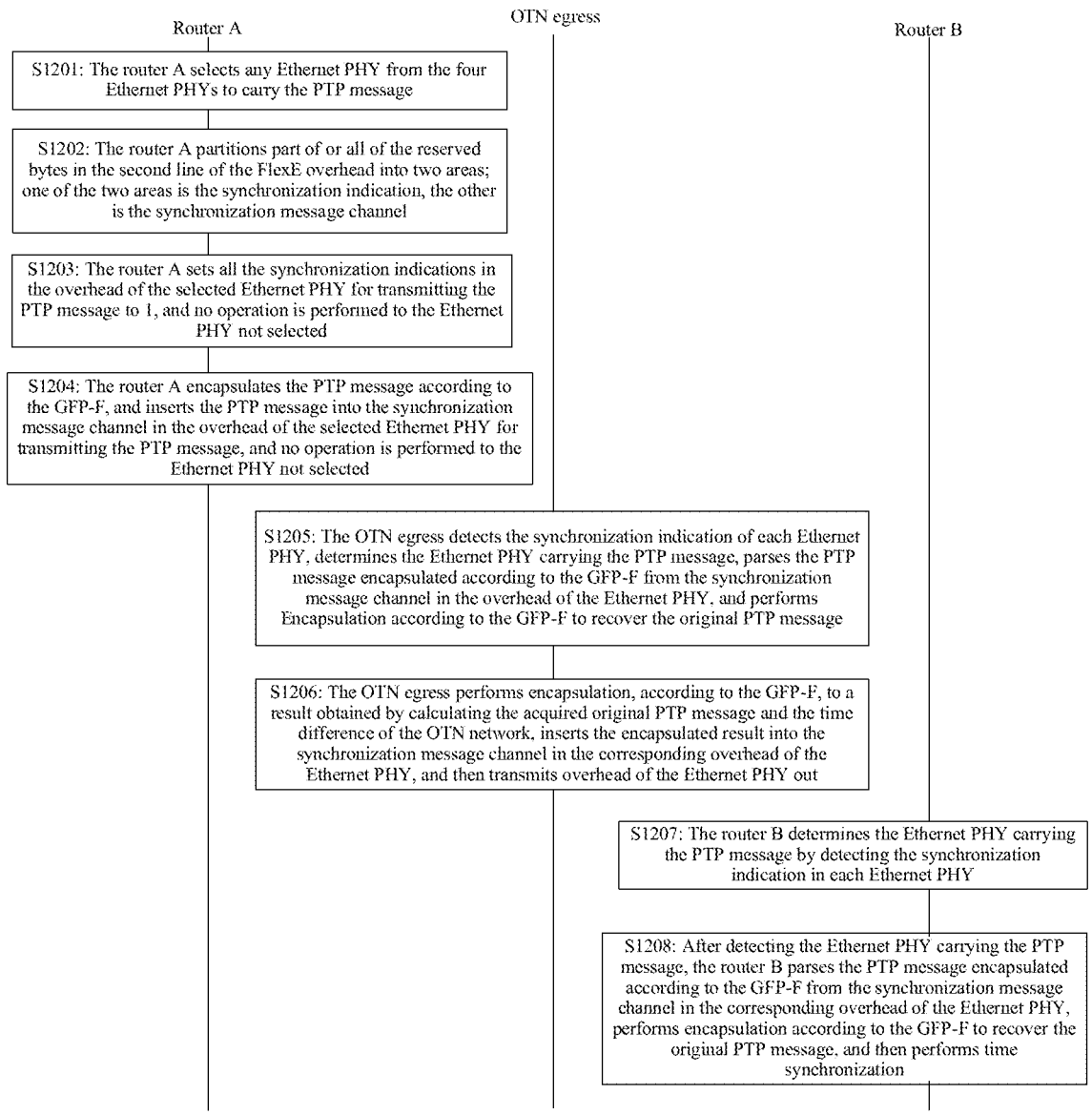
FIG. 12 is a flowchart of another specific embodiment of the present disclosure.

The application example takes the FlexE over OTN shown in FIG. 5 as the application scenario, in which a 300G user service needs to be transmitted from the router A to the router B, and the rate of each Ethernet PHY is 100G; the service is carried by four Ethernet PHYs; here, five unusable time slots are included in each PHY, and the five unusable time slots are removed at the OTN inlet and inserted back at the ONT egress; and the synchronization message is the PTP message. Referring to FIG. 12, the flow may include the following acts.

At S1201, the router A selects any Ethernet PHY from the four Ethernet PHYs to carry the PTP message.

At S1202, the router A partitions part of or all of the reserved bytes in the second line of the FlexE overhead into two areas; one of the two areas is the synchronization indication with the size of 1 byte, the other is the synchronization message channel with the size of 3 bytes.

As an exemplary embodiment, the structure of the FlexE overhead after partition is shown in FIG. 4, and the default values of the two areas are 0.

At S1203, the router A sets all the synchronization indications in the overhead of the selected Ethernet PHY for transmitting the PTP message to 1, and no operation is performed to the Ethernet PHY not selected.

At S1204, the router A encapsulates the PTP message according to the GFP-F, and inserts the PTP message into the synchronization message channel in the overhead of the selected Ethernet PHY for transmitting the PTP message, and no operation is performed to the Ethernet PHY not selected.

It is to be noted that the complete PTP message is transmitted by using the same overhead multiframe mode as the FlexE, that is, a complete PTP message is transmitted through 32 FlexE overhead frames. The generation period of the PTP message is consistent with the period of the FlexE overhead multiframe, that is, every 32 FlexE overhead frames generate a PTP message.

At S1205, the OTN egress detects the synchronization indication of each Ethernet PHY, determines the Ethernet PHY carrying the PTP message, parses the PTP message encapsulated according to the GFP-F from the synchronization message channel in the overhead of the Ethernet PHY, and encapsulates according to the GFP-F to recover the original PTP message.

At S1206, the OTN egress encapsulates, according to the GFP-F, a result obtained by calculating the acquired original PTP message and the time difference of the OTN network, inserts the encapsulated result into the synchronization message channel in the corresponding overhead of the Ethernet PHY, and then transmits overhead of the Ethernet PHY out.

It is to be noted that the time difference of the OTN network may be obtained through an OSMC overhead of the OTN.

At S1207, the router B determines the Ethernet PHY carrying the PTP message by detecting the synchronization indication in each Ethernet PHY.

At S1208, after detecting the Ethernet PHY carrying the PTP message, the router B parses the PTP message encapsulated according to the GFP-F from the synchronization message channel in the corresponding overhead of the Ethernet PHY, encapsulates according to the GFP-F to recover the original PTP message, and then performs time synchronization according to the PTP message.

As an exemplary embodiment, the router A in the application example corresponds to the transmitting end and the OTN egress in the embodiment of FIG. 6, and the router B corresponds to the receiving end in the embodiment of FIG. 9.

Application Example 3

Figure 13:
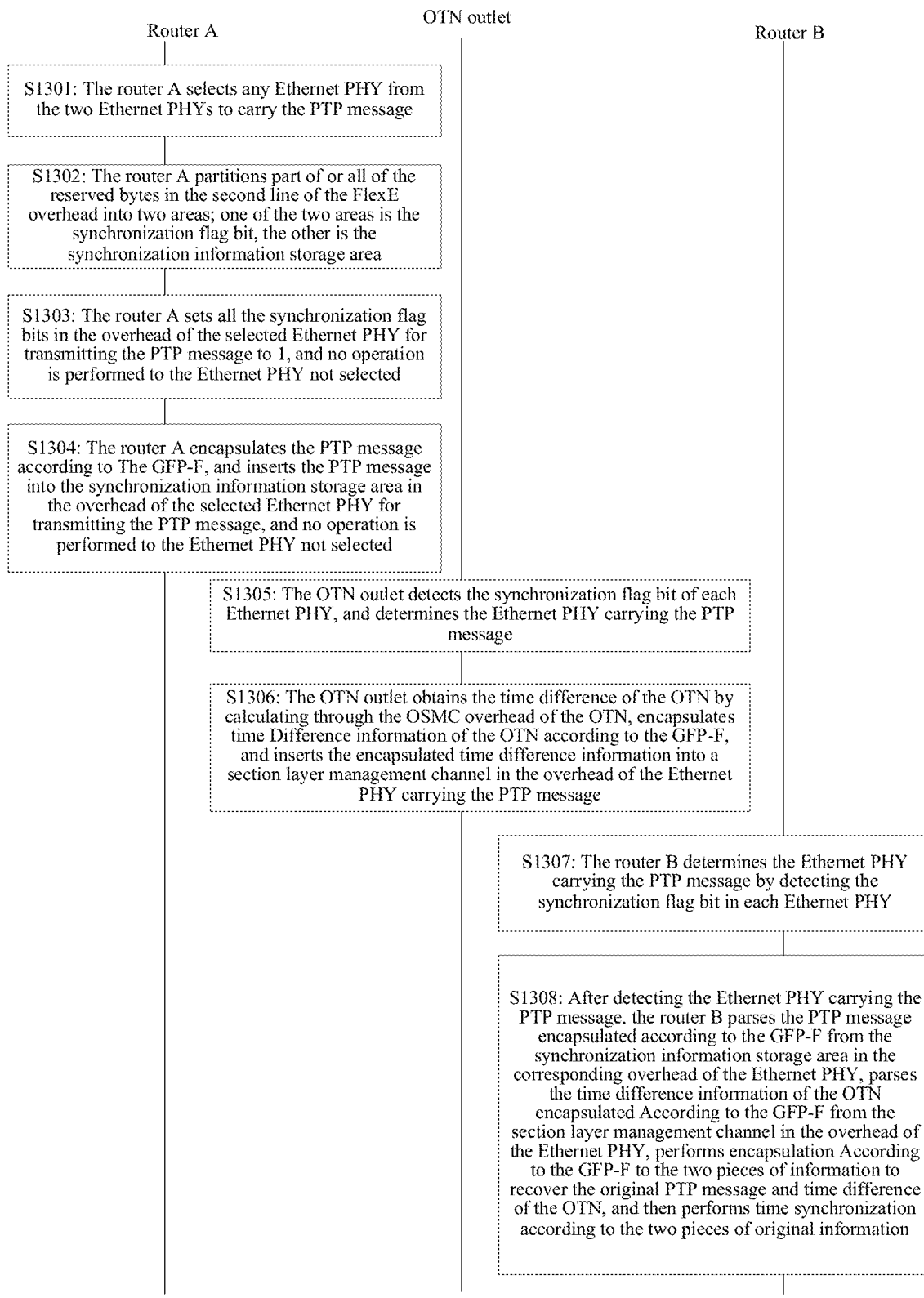
FIG. 13 is a flowchart of yet another specific embodiment of the present disclosure.

The application example still takes the FlexE over OTN shown in FIG. 5 as the application scenario, in which a user service of 150G needs to be transmitted from the router A to the router B, and the rate of each Ethernet PHY is 100G; the service is carried by two Ethernet PHYs; here, five unusable time slots are included in each PHY, and the five unusable time slots are removed at the OTN inlet and inserted back at the ONT egress; and the synchronization message is the PTP message. Referring to FIG. 13, the flow may include the following acts.

At S1301, the router A selects any Ethernet PHY from the two Ethernet PHYs to carry the PTP message.

At S1302, the router A partitions part of or all of the reserved bytes in the second line of the FlexE overhead into two areas; one of the two areas is the synchronization indication with the size of 1 byte, the other is the synchronization message channel with the size of 3 bytes.

As an exemplary embodiment, the structure of the FlexE overhead after partition is shown in FIG. 4, and the default values of the two areas are 0.

At S1303, the router A sets all the synchronization indications in the overhead of the selected Ethernet PHY for transmitting the PTP message to 1, and no operation is performed to the Ethernet PHY not selected.

At S1304, the router A encapsulates the PTP message according to the GFP-F, and inserts the PTP message into the synchronization message channel in the overhead of the selected Ethernet PHY for transmitting the PTP message, and no operation is performed to the Ethernet PHY not selected.

It is to be noted that the complete PTP message is transmitted by using the same overhead multiframe mode as the FlexE, that is, a complete PTP message is transmitted through 32 FlexE overhead frames. The generation period of the PTP message is consistent with the period of the FlexE overhead multiframe, that is, every 32 FlexE overhead frames generate a PTP message.

At S1305, the OTN egress detects the synchronization indication of each Ethernet PHY, and determines the Ethernet PHY carrying the PTP message.

At S1306, the OTN egress obtains the time difference of the OTN by calculating through the OSMC overhead of the OTN, encapsulates time difference information of the OTN according to the GFP-F, and inserts the encapsulated time difference information into a section layer management channel in the overhead of the Ethernet PHY carrying the PTP message.

At S1307, the router B determines the Ethernet PHY carrying the PTP message by detecting the synchronization indication in each Ethernet PHY.

At S1308, after detecting the Ethernet PHY carrying the PTP message, the router B parses the PTP message encapsulated according to the GFP-F from the synchronization message channel in the corresponding overhead of the Ethernet PHY, parses the time difference information of the OTN encapsulated according to the GFP-F from the section layer management channel in the overhead of the Ethernet PHY, encapsulates according to the GFP-F to the two pieces of information to recover the original PTP message and time difference of the OTN, and then performs time synchronization according to the two pieces of original information.

As an exemplary embodiment, the router A in the application example corresponds to the transmitting end and the OTN egress in the embodiment of FIG. 7, and the router B corresponds to the receiving end in the embodiment of FIG. 10.

In the above three application examples, the above embodiments are illustrated from three application scenarios. It can be seen that at least one Ethernet PHY is selected from the FlexE group in the FlexE structure to transmit the synchronization message, thereby implementing the transmission of the synchronization message in the FlexE.

Figure 14:
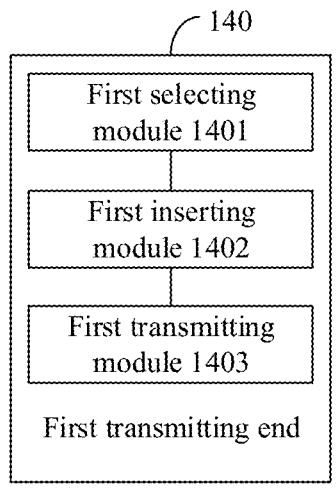
FIG. 14 is a structure diagram of a first transmitting end provided by an embodiment of the present disclosure.

FIG. 14 shows the first transmitting end 140 provided by an embodiment of the present disclosure. The first transmitting end 140 includes: the first selecting module 1401, the first inserting module 1402, and the first transmitting module 1403; wherein, the first selecting module 1401 is configured to select from a FlexE group at least one Ethernet PHY for synchronization message transmission;

the first inserting module 1402 is configured to, after encapsulating synchronization message according to a preset encapsulation strategy, insert the synchronization message into a synchronization message channel in overhead of the selected Ethernet PHY; and the first transmitting module 1403 is configured to transmit the synchronization message through the selected Ethernet PHY.

Figure 15:
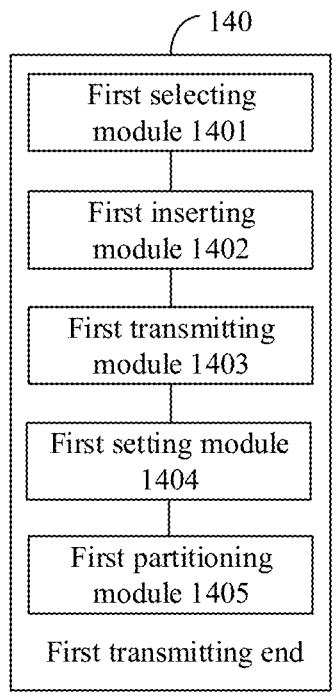
FIG. 15 is a structure diagram of another first transmitting end provided by an embodiment of the present disclosure.

In the above solution, referring to FIG. 15, the first transmitting end 140 may further include the first setting module 1404, which is configured to set the synchronization indicator in the overhead of the selected Ethernet PHY, wherein the synchronization indicator is used for indicating that there is synchronization message carried in the Ethernet PHY with the synchronization indicator.

In the above solution, referring to FIG. 15, the first transmitting end 140 may further include: the first partitioning module 1405, which is configured to partition part of or all of the reserved bytes of the FlexE overhead into at least one of the synchronization message channel and the synchronization indication, wherein the synchronization indication is used for carrying the synchronization indicator.

In the above solution, the first inserting module 1402 is configured to encapsulate the synchronization message according to the GFP-F, and insert the encapsulated synchronization message into the synchronization message channel in the overhead of the selected Ethernet PHY.

In the above solution, the synchronization message may include the PTP message.

In the above solution, the generation period of the PTP message satisfies the clock time synchronization requirement.

Figure 16:
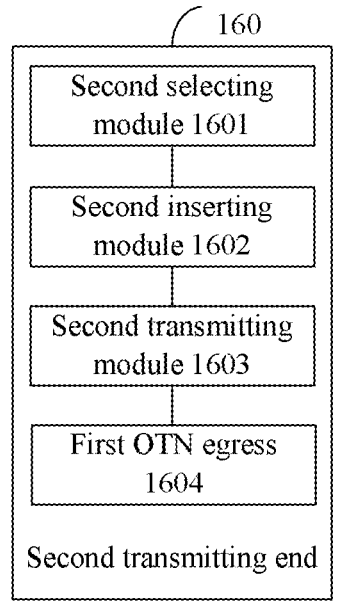
FIG. 16 is a structure diagram of a second transmitting end provided by an embodiment of the present disclosure.

FIG. 16 shows the second transmitting end 160 provided by an embodiment of the present disclosure. The second transmitting end 160 includes: the second selecting module 1601, the second inserting module 1602, the second transmitting module 1603, and the first OTN egress 1604; wherein, the second selecting module 1601 is configured to select from a FlexE group at least one Ethernet PHY for synchronization message transmission;

the second inserting module 1602 is configured to, after encapsulating an original synchronization message according to a preset encapsulation strategy, insert the original synchronization message into a synchronization message channel in overhead of the selected Ethernet PHY;

the second transmitting module 1603 is configured to transmit the original synchronization message to the first OTN egress through the selected Ethernet PHY;

the first OTN egress 1604 is configured to determine the selected Ethernet PHY, and perform de-encapsulation from the selected Ethernet PHY to acquire the original synchronization message, and update the original synchronization message according to time difference of OTN to acquire an updated synchronization message, and after encapsulating the updated synchronization message according to the preset encapsulation strategy, insert the updated synchronization message into the synchronization message channel in the overhead of the selected Ethernet PHY, and transmit the updated synchronization message through the selected Ethernet PHY.

Figure 17:
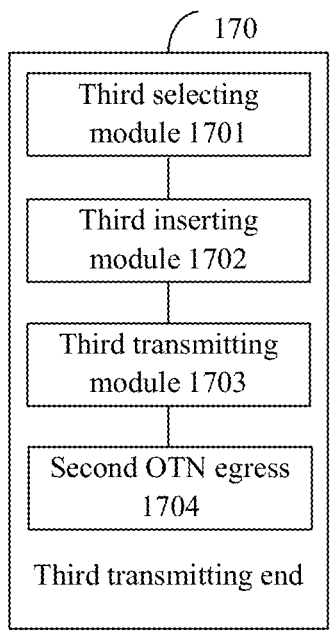
FIG. 17 is a structure diagram of a third transmitting end provided by an embodiment of the present disclosure.

FIG. 17 shows the third transmitting end 170 provided by an embodiment of the present disclosure. The third transmitting end 170 may include: the third selecting module 1701, the third inserting module 1702, the third transmitting module 1703, and the second OTN egress 1704; wherein, the third selecting module 1701 is configured to select from a FlexE group at least one Ethernet PHY for synchronization message transmission;

the third inserting module 1702 is configured to, after encapsulating an original synchronization message according to a preset encapsulation strategy, insert the original synchronization message into a synchronization message channel in overhead of the selected Ethernet PHY;

the third transmitting module 1703 is configured to transmit the original synchronization message to the second OTN egress through the selected Ethernet PHY;

the second OTN egress 1704 is configured to determine the selected Ethernet PHY, and after encapsulating the time difference of the OTN according to the preset encapsulation strategy, insert the time difference of the OTN into the management channel of the overhead of the selected Ethernet PHY, and transmit the original synchronization message and the time difference of the OTN through the selected Ethernet PHY.

Figure 18:
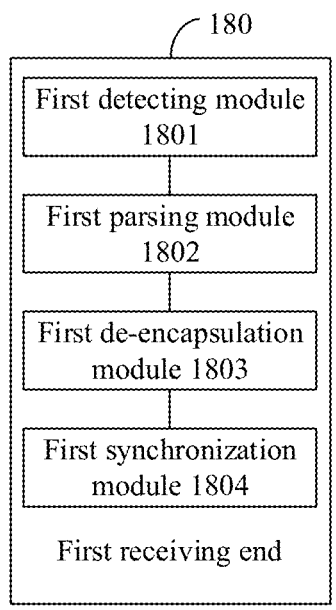
FIG. 18 is a structure diagram of a first receiving end provided by an embodiment of the present disclosure.

FIG. 18 shows the structure of the first receiving end 180 provided by an embodiment of the present disclosure. The first receiving end includes: the first detecting module 1801, the first parsing module 1802, the first de-encapsulation module 1803, and the first the first detecting module 1801 is configured to detect from a FlexE group at least one Ethernet PHY for synchronization message transmission;

the first parsing module 1802 is configured to acquire encapsulated synchronization message by parsing from a synchronization message channel in overhead of the Ethernet PHY for synchronization message transmission;

the first de-encapsulation module 1803 is configured to acquire synchronization message from the encapsulated synchronization message through a preset de-encapsulation strategy; and the first synchronization module 1804 is configured to perform time synchronization according to the synchronization message.

In the above solution, there is also the synchronization indicator included in the overhead of the Ethernet PHY for synchronization message transmission, wherein the synchronization indicator is used for indicating that there is synchronization message carried in the Ethernet PHY with the synchronization indicator.

Correspondingly, the first detecting module 1801 is configured to, determine from the FlexE group the Ethernet PHY for synchronization message transmission by detecting the synchronization indicator in the Ethernet PHY.

In the above solution, the synchronization message may include the PTP message.

In the above solution, the encapsulated synchronization message is the synchronization message encapsulated according to the GFP-F.

Correspondingly, the first de-encapsulation module 1803 is configured to perform de-encapsulation to the encapsulated synchronization message according to the GFP-F to acquire the original synchronization message.

Figure 19:
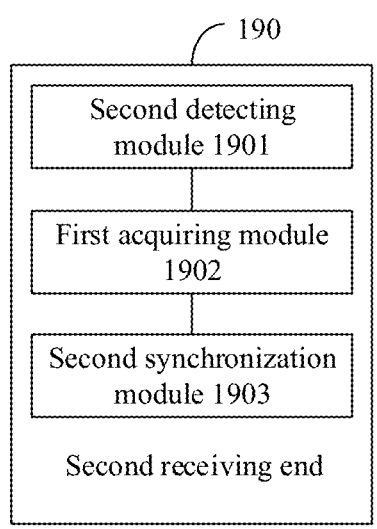
FIG. 19 is a structure diagram of a second receiving end provided by an embodiment of the present disclosure.

FIG. 19 shows the second receiving end 190 provided by an embodiment of the present disclosure. The second receiving end 190 may include: the second detecting module 1901, the first acquiring module 1902, and the second synchronization module 1903; wherein, the second detecting module 1901 is configured to detect from a FlexE group at least one Ethernet PHY for synchronization message transmission;

the first acquiring module 1902 is configured to acquire synchronization message updated by an OTN egress from overhead of the Ethernet PHY for synchronization message transmission; and the second synchronization module 1903 is configured to perform time synchronization according to the synchronization message updated by the OTN egress.

Figure 20:
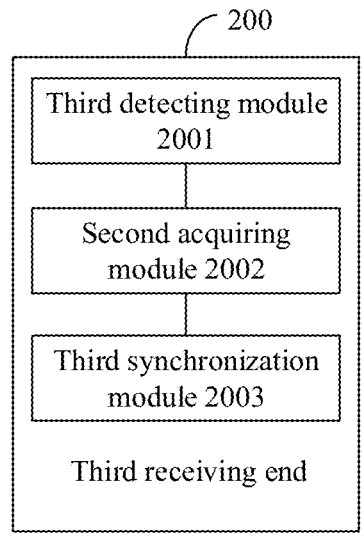
FIG. 20 is a structure diagram of a third receiving end provided by an embodiment of the present disclosure.

FIG. 20 shows the third receiving end 200 provided by an embodiment of the present disclosure. The third receiving end 200 may include: the third detecting module 2001, the second acquiring module 2002 and the third synchronization module 2003; wherein, the third detecting module 2001 is configured to detect from a FlexE group at least one Ethernet PHY for synchronization message transmission;

the second acquiring module 2002 is configured to acquire original synchronization message and time difference of OTN from overhead of the Ethernet PHY for synchronization message transmission;

the third synchronization module 2003 is configured to perform time synchronization according to the original synchronization message and the time difference of the OTN.

Figure 21:
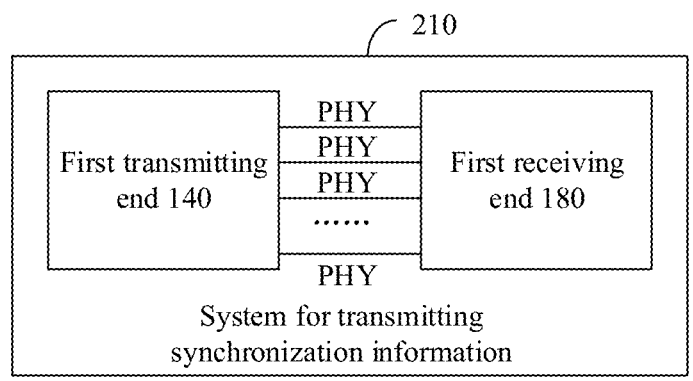
FIG. 21 is a structure diagram of a system for synchronization message transmission provided by an embodiment of the present disclosure.

FIG. 21 shows the system for synchronization message transmission 210 provided by an embodiment of the present disclosure. The system 210 includes: the first transmitting end 140 and the first receiving end 180; wherein, the first transmitting end 140 is configured to select from a FlexE group at least one Ethernet PHY for synchronization message transmission, and after encapsulating synchronization message according to a preset encapsulation strategy, insert the synchronization message into a synchronization message channel in overhead of the selected Ethernet PHY, and transmit the synchronization message through the selected Ethernet PHY;

the first receiving end 180 is configured to detect from the FlexE group the Ethernet PHY for synchronization message transmission, and acquire the encapsulated synchronization message by parsing from the synchronization message channel in the overhead of the Ethernet PHY for synchronization message transmission, and acquire the synchronization message from the encapsulated synchronization message through the preset de-encapsulation strategy, and perform time synchronization according to the synchronization message.

Figure 22:
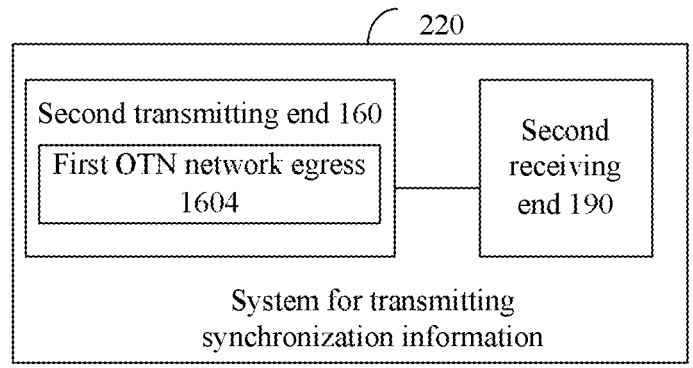
FIG. 22 is a structure diagram of another system for synchronization message transmission provided by an embodiment of the present disclosure.

FIG. 22 shows the system for synchronization message transmission 220 provided by an embodiment of the present disclosure. The system 220 includes: the second transmitting end 160 and the second receiving end 190; wherein, the second transmitting end 160 is configured to select from a FlexE group at least one Ethernet PHY for synchronization message transmission, and after encapsulating an original synchronization message according to a preset encapsulation strategy, insert the original synchronization message into a synchronization message channel in overhead of the selected Ethernet PHY, and transmit the original synchronization message to the first OTN egress through the selected Ethernet PHY;

the first OTN egress 1604 is configured to determine the selected Ethernet PHY, and perform de-encapsulation from the selected Ethernet PHY to acquire the original synchronization message, and update the original synchronization message according to the time difference of the OTN to acquire an updated synchronization message, and after encapsulating the updated synchronization message according to the preset encapsulation strategy, insert the updated synchronization message into the synchronization message channel in the overhead of the selected Ethernet PHY, and transmit the updated synchronization message through the selected Ethernet PHY;

the second receiving end 190 is configured to detect from the FlexE group the Ethernet PHY for synchronization message transmission, and acquire the synchronization message updated by the OTN egress from the overhead of the Ethernet PHY for synchronization message transmission, and perform time synchronization according to the synchronization message updated by the OTN egress.

Figure 23:
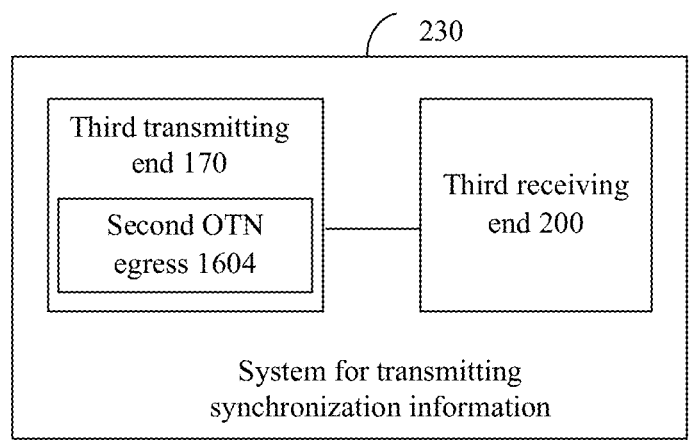
FIG. 23 is a structure diagram of yet another system for synchronization message transmission provided by an embodiment of the present disclosure.

FIG. 23 shows the system for synchronization message transmission 230 provided by an embodiment of the present disclosure. The system 230 includes the third transmitting end 170 and the third receiving end 200; wherein, the third transmitting end 170 is configured to select from a FlexE group at least one Ethernet PHY for synchronization message transmission, and after encapsulating an original synchronization message according to a preset encapsulation strategy, insert the original synchronization message into a synchronization message channel in overhead of the selected Ethernet PHY, and transmit the original synchronization message to the second OTN egress 1704 through the selected Ethernet PHY;

the second OTN egress 1704 is configured to determine the selected Ethernet PHY, and after encapsulating the time difference of the OTN according to the preset encapsulation strategy, insert the time difference of the OTN into the management channel of the overhead of the selected Ethernet PHY, and transmit the original synchronization message and the time difference of the OTN through the selected Ethernet PHY;

the third receiving end 200 is configured to detect from the FlexE group the Ethernet PHY for synchronization message transmission, and acquire the original synchronization message and the time difference of the OTN from the overhead of the Ethernet PHY for synchronization message transmission, and perform time synchronization according to the original synchronization message and the time difference of the OTN.

Those of ordinary skill in the art may understand that all or some of the acts in the above method disclosed, the system, the functional modules/units in the device may be implemented as software, firmware, hardware and a proper combination of them. In an implementation of hardware, the division among the functional modules/units mentioned in the above description does not necessarily correspond to the division of physical units; for example, a physical component may have multiple functions, or a function or act may be performed by several physical components in coordination. Some or all of the components may be implemented as software performed a processor, for example, a digital signal processor or a microprocessor, or implemented as hardware, or implemented as an integrated circuit, for example, an application-specific integrated circuit. Such software may be distributed on computer readable media. The computer readable media may include computer storage media (or non-temporary media) and communication media (or temporary media). As those ordinary skilled in the art know, the term computer storage media include volatile and non-volatile media, and removable and un-removable media which are implemented in any method or technology for storing information (such as a computer readable instruction, a data structure, a program module or other data). The computer storage media include, but not limited to, an RAM, an ROM, an EEPROM, a flash memory or other memory technologies, a CD-ROM, a Digital Video Disk (DVD) or other optical storage, a cartridge, a tape, a disk storage or other magnetic storage devices, or any other media which may be used for storing expected information and may be accessed by a computer. Moreover, as those ordinary skilled in the art know, the communication media generally include the computer readable instruction, the data structure, the program module or other data, such as carriers or other transmission mechanisms, in a modulation data signal, and may include any information delivery media.

The above is only the optional embodiments of the present disclosure and not intended to limit the scope of protection of the present disclosure.

INDUSTRIAL APPLICABILITY

The present disclosure achieves the effect of transmitting synchronization messages in the FlexE.

What is claimed is:

1. A method for synchronization message transmission, comprising:
    selecting from a Flexible Ethernet (FlexE) group, by a transmitting end, at least one Ethernet Physical Layer Link (PHY) for synchronization message transmission;
    after encapsulating the synchronization message according to a preset encapsulation strategy, inserting, by the transmitting end, the synchronization message into a synchronization message channel in overhead of the selected Ethernet PHY; and
    transmitting, by the transmitting end, the synchronization message through the selected Ethernet PHY.

2. The method as claimed in claim 1, further comprising:
    setting, by the transmitting end, a synchronization indicator in the overhead of the selected Ethernet PHY, wherein the synchronization indicator is used for indicating that there is synchronization message carried in the Ethernet PHY with the synchronization indicator;
    correspondingly, the method further comprising: when synchronization message transmission through the selected Ethernet PHY, transmitting, by the transmitting end, the synchronization indicator through the selected Ethernet PHY.

3. The method according to claim 2, further comprising:
    partitioning, by the transmitting end, part of or all of reserved bytes of a FlexE overhead into at least one of the synchronization message channel and a synchronization indication, wherein the synchronization indication is used for carrying the synchronization indicator.

4. The method according to claim 3, wherein partitioning, by the transmitting end, part of or all of the reserved bytes of the FlexE overhead into at least one of the synchronization message channel and the synchronization indication comprises:
    partitioning, by the transmitting end, part of or all of the reserved bytes of the FlexE overhead into the synchronization indication with a size of first preset byte length and the synchronization message channel with a size of second preset byte length.

5. The method as claimed in claim 1, wherein after encapsulating the synchronization message according to the preset encapsulation strategy, inserting, by the transmitting end, the synchronization message into the synchronization message channel in the overhead of the selected Ethernet PHY comprises:
    encapsulating, by the transmitting end, the synchronization message according to a Frame mapped Generic Framing Procedure (GFP-F); and
    inserting, by the transmitting end, the encapsulated synchronization message into the synchronization message channel in the overhead of the selected Ethernet PHY.

6. The method as claimed in claim 1, wherein the synchronization message comprises a Precision Time Protocol (PTP) message.

7. The method as claimed in claim 5, wherein a generation period of the PTP message satisfies a clock time synchronization requirement.

8. The method as claimed in claim 6, wherein transmitting, by the transmitting end, the synchronization message through the selected Ethernet PHY comprises:
    transmitting a complete PTP message through N FlexE overhead frames in the selected Ethernet PHY, where the N is a positive integer.

9. The method as claimed in claim 1, wherein the synchronization message is an original synchronization message, after transmitting, by the transmitting end, the original synchronization message to an Optical Transport Network (OTN) egress through the selected Ethernet PHY, the method further comprises:
    determining, by the OTN egress, the selected Ethernet PHY;
    performing, by the OTN egress, de-encapsulation from the selected Ethernet PHY to acquire the original synchronization message;
    updating, by the OTN egress, the original synchronization message according to time difference of OTN to acquire an updated synchronization message;
    after encapsulating the updated synchronization message according to the preset encapsulation strategy, inserting, by the OTN egress, the updated synchronization message into the synchronization message channel in the overhead of the selected Ethernet PHY; and
    transmitting, by the OTN egress, the updated synchronization message through the selected Ethernet PHY.

10. The method as claimed in claim 9, further comprising:
    setting, by the transmitting end, a synchronization indicator in the overhead of the selected Ethernet PHY, wherein the synchronization indicator is used for indicating that there is synchronization message carried in the Ethernet PHY with the synchronization indicator;
    correspondingly, determining, by the OTN egress, the selected Ethernet PHY comprises: recognizing, by the OTN egress, the synchronization indicator of the Ethernet PHY to determine the selected Ethernet PHY;
    correspondingly, the method further comprises: when transmitting the updated synchronization message through the selected Ethernet PHY, transmitting, by the OTN egress, the synchronization indicator through the selected Ethernet PHY.

11. The method as claimed in claim 1, wherein the synchronization message is an original synchronization message, after transmitting, by the transmitting end, the original synchronization message to an Optical Transport Network (OTN) egress through the selected Ethernet PHY, the method further comprises:
    determining, by the OTN egress, the selected Ethernet PHY;
    after encapsulating time difference of OTN according to the preset encapsulation strategy, inserting, by the OTN egress, the time difference of the OTN into a management channel of the overhead of the selected Ethernet PHY; and transmitting, by the OTN network egress, the original synchronization message and the time difference of the OTN through the selected Ethernet PHY.

12. The method as claimed in claim 11, further comprising:
setting, by the transmitting end, a synchronization indicator in the overhead of the selected Ethernet PHY, wherein the synchronization indicator is used for indicating that there is synchronization message carried in the Ethernet PHY with the synchronization indicator;
correspondingly, determining, by the OTN egress, the selected Ethernet PHY comprises: recognizing, by the OTN egress, the synchronization indicator of the Ethernet PHY to determine the selected Ethernet PHY;
correspondingly, the method further comprises: when transmitting the original synchronization message and the time difference of the OTN through the selected Ethernet PHY, transmitting, by the OTN network egress, the synchronization indicator through the selected Ethernet PHY.

13. A method for synchronization message transmission, comprising:
detecting from a Flexible Ethernet (FlexE) group, by a receiving end, at least one Ethernet Physical Layer Link (PHY) for synchronization message transmission;
acquiring, by the receiving end, encapsulated synchronization message by parsing from a synchronization message channel in overhead of the Ethernet PHY for synchronization message transmission;
acquiring, by the receiving end, the synchronization message from the encapsulated synchronization message through a preset de-encapsulation strategy; and
performing, by the receiving end, time synchronization according to the synchronization message.

14. The method as claimed in claim 13, wherein there is also a synchronization indicator comprised in the overhead of the Ethernet PHY for synchronization message transmission, the synchronization indicator is used for indicating that there is synchronization message carried in the Ethernet PHY with the synchronization indicator;
correspondingly, detecting from the FlexE group, by the receiving end, the Ethernet PHY for synchronization message transmission comprises:
determining from the FlexE group, by the receiving end, the Ethernet PHY for synchronization message transmission by detecting the synchronization indicator in the Ethernet PHY.

15. The method as claimed in claim 13, wherein the synchronization message comprises a Precision Time Protocol (PTP) message.

16. The method as claimed in claim 13, wherein the encapsulated synchronization message is the synchronization message encapsulated according to a Frame mapped Generic Framing Procedure (GFP-F);
correspondingly, acquiring, by the receiving end, original synchronization message from the encapsulated synchronization message through the preset de-encapsulation strategy comprises:
performing de-encapsulation, by the receiving end, to the encapsulated synchronization message according to the GFP-F to acquire the original synchronization message.

17. The method as claimed in claim 13, wherein
acquiring, by the receiving end, the encapsulated synchronization message by parsing from a synchronization message channel in the overhead of the Ethernet PHY for transmitting the synchronization message comprises:
acquiring, by the receiving end, synchronization message updated by an Optical Transport Network (OTN) egress from overhead of the Ethernet PHY for synchronization message transmission; and
performing, by the receiving end, time synchronization according to the synchronization message comprises: performing, by the receiving end, time synchronization according to the synchronization message updated by the OTN egress.

18. The method as claimed in claim 13, wherein acquiring, by the receiving end, the encapsulated synchronization message by parsing from the synchronization message channel in the overhead of the Ethernet PHY for transmitting the synchronization message comprises: acquiring, by the receiving end, original synchronization message and a time difference of Optical Transport Network (OTN) from overhead of the Ethernet PHY for synchronization message transmission; and
performing, by the receiving end, time synchronization according to the synchronization message comprises: performing, by the receiving end, time synchronization according to the original synchronization message and the time difference of the OTN.

19. A first transmitting end, comprising: a first selecting module, a first inserting module, and a first transmitting module; wherein,
the first selecting module is configured to select from a Flexible Ethernet (FlexE) group at least one Ethernet Physical Layer Link (PHY) for synchronization message transmission;
the first inserting module is configured to, after encapsulating the synchronization message according to a preset encapsulation strategy, insert the synchronization message into a synchronization message channel in overhead of the selected Ethernet PHY; and
the first transmitting module is configured to transmit the synchronization message through the selected Ethernet PHY.

20. A first receiving end, comprising: a first detecting module, a first parsing module, a first de-encapsulation module, and a first synchronization module; wherein,
the first detecting module is configured to detect from a Flexible Ethernet (FlexE) group at least one Ethernet Physical Layer Link (PHY) for synchronization message transmission;
the first parsing module is configured to acquire encapsulated synchronization message by parsing from a synchronization message channel in overhead of the Ethernet PHY for synchronization message transmission;
the first de-encapsulation module is configured to acquire the synchronization message from the encapsulated synchronization message through a preset de-encapsulation strategy; and
the first synchronization module is configured to perform time synchronization according to the synchronization message.

* * * * *